US007958495B2

(12) United States Patent
Kelso

(10) Patent No.: US 7,958,495 B2
(45) Date of Patent: Jun. 7, 2011

(54) PROGRAM TEST SYSTEM

(75) Inventor: Tim Kelso, Colleyville, TX (US)

(73) Assignee: Systemware, Inc., Addison, TX (US)

( * ) Notice: Subject to any disclaimer, the term of this patent is extended or adjusted under 35 U.S.C. 154(b) by 1027 days.

(21) Appl. No.: 11/683,908

(22) Filed: Mar. 8, 2007

(65) Prior Publication Data

US 2008/0222454 A1 Sep. 11, 2008

(51) Int. Cl.
*G06F 9/44* (2006.01)

(52) U.S. Cl. ........................................................ 717/124

(58) Field of Classification Search ........... 717/124–126
See application file for complete search history.

(56) References Cited

U.S. PATENT DOCUMENTS

| | | | |
|---|---|---|---|
| 6,031,990 A | 2/2000 | Sivakumar et al. | |
| 6,205,407 B1 * | 3/2001 | Testa et al. | 702/119 |
| 6,301,701 B1 * | 10/2001 | Walker et al. | 717/125 |
| 6,332,211 B1 | 12/2001 | Pavela | |
| 6,421,822 B1 | 7/2002 | Pavela | |
| 6,654,911 B1 | 11/2003 | Miles | |
| 6,978,440 B1 | 12/2005 | Pavela | |
| 6,993,748 B2 | 1/2006 | Schaefer | |
| 7,313,564 B2 | 12/2007 | Melamed et al. | |
| 7,478,365 B2 | 1/2009 | West et al. | |
| 7,490,319 B2 * | 2/2009 | Blackwell et al. | 717/124 |
| 7,580,946 B2 | 8/2009 | Mansour et al. | |
| 7,581,212 B2 * | 8/2009 | West et al. | 717/136 |
| 7,603,658 B2 * | 10/2009 | Subramanian et al. | 717/126 |
| 7,644,396 B2 | 1/2010 | Cleaveland et al. | |
| 7,810,070 B2 | 10/2010 | Nasuti et al. | |
| 2002/0029377 A1 | 3/2002 | Pavela | |

(Continued)

OTHER PUBLICATIONS

Systemware TS, Software Test Automation, Test Execution Services; 2006 Systemware Testing Solutions.

(Continued)

*Primary Examiner* — Wei Y Zhen
*Assistant Examiner* — Junchun Wu
(74) *Attorney, Agent, or Firm* — David W. Carstens; Steven H. Washam; Carstens & Cahoon, LLP

(57) ABSTRACT

An improved automated software testing system provides the ability to generate and reuse test cases over multiple platforms. Keywords and natural language are used in test case creation, simplifying the process for non-technical business users. Business users can write test cases without scripts. Test cases can be generated even before the application to be tested is available. Data substitution provides ability for test cases to adapt to changing data. Abstraction allows use of all third-party and custom software test tools to be incorporated. Persistent data handling allows capture of data generated during test execution for later use. Testing can be performed entirely automatically or can incorporate some manual interaction. Test results, screen captures of the system tested, along with environment and machine variables are saved in results logs for later review.

28 Claims, 21 Drawing Sheets

U.S. PATENT DOCUMENTS

| | | |
|---|---|---|
| 2002/0091968 A1 | 7/2002 | Moreaux et al. |
| 2003/0052917 A1 | 3/2003 | Dubovsky |
| 2003/0055836 A1 | 3/2003 | Dubovsky |
| 2003/0056150 A1 | 3/2003 | Dubovsky |
| 2003/0084429 A1 | 5/2003 | Schaefer |
| 2003/0126586 A1 | 7/2003 | Sluiman et al. |
| 2004/0073886 A1 | 4/2004 | Irani |
| 2004/0073890 A1 | 4/2004 | Johnson et al. |
| 2004/0107415 A1* | 6/2004 | Melamed et al. .............. 717/124 |
| 2004/0143819 A1 | 7/2004 | Cheng et al. |
| 2004/0249689 A1 | 12/2004 | Naraki et al. |
| 2004/0261053 A1 | 12/2004 | Dougherty et al. |
| 2005/0097535 A1 | 5/2005 | Plum |
| 2005/0166094 A1 | 7/2005 | Blackwell et al. |
| 2005/0204343 A1* | 9/2005 | Kisamore et al. ............. 717/124 |
| 2006/0156287 A1* | 7/2006 | Vikram ......................... 717/124 |
| 2006/0206870 A1 | 9/2006 | Moulden, Jr. et al. |
| 2006/0265691 A1 | 11/2006 | Klinger et al. |
| 2007/0022407 A1* | 1/2007 | Givoni et al. ................. 717/124 |
| 2007/0032991 A1* | 2/2007 | Bingham et al. .............. 702/189 |
| 2007/0234127 A1* | 10/2007 | Nguyen .......................... 714/38 |
| 2007/0277154 A1* | 11/2007 | Badwe .......................... 717/124 |
| 2008/0086627 A1 | 4/2008 | Splaine et al. |
| 2008/0126880 A1* | 5/2008 | Hegarty et al. .................. 714/46 |
| 2008/0148219 A1 | 6/2008 | Ousterhout et al. |
| 2010/0217776 A1 | 8/2010 | Meijer et al. |

OTHER PUBLICATIONS

Theresa Lanowitz, Magic Quadrant for Application Quality Ecosystem, 2005: Leaders and Challengers; Gartner Research, Publication Date: Mar. 8, 2005, ID No. G00124029.

Michele Cantara, SOAs Cause Evolutionary Disruption in IT Services Market; Gartner Research, Publication Date: Apr. 7, 2004, ID No. COM-22-2098.

Jim Duggan, et al., Hype Cysle for Application Development, 2004; Gartner Research, Publication Date: Jun. 25, 2004, ID No. G00120914.

Mercury Business Process Testing, p.3-p.13; www.Mercury.com.

L. Scardino, L. Stone; IT Service Market Isn't Positioned to Deliver Sustained Value; Strategic Planning, SPA-21-4410, Gartner Research, Nov. 24, 2003.

Ron Patton, "Software Testing, Second Edition", Jul. 26, 2006, Sams Publishing, Chapter 18.

US Census Bureau, Foreign Trade Statistics; "Improving ASCII Delimited Filed Into a Spreadsheet: How Do I do It?"; (Dec. 17, 1999).

* cited by examiner

Test Case Hierarchy

*Test Case Hierarchy*

PROGRAM TEST SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to the automated testing of software and, more specifically, to a system and method that simplifies user interaction with software testing tools and corresponding software applications under test.

2. Description of Related Art Including Information Disclosed Under 37 CFR 1.97 and 1.98

In its infancy, software development was performed in small shops with relatively few developers. The resulting software applications tended to be small and relatively simple in operation, and were often designed to run on standalone computer systems. Because of the simple nature of the applications, their operation could be easily and efficiently tested by end users without special skills. The end users would exercise the application, discover a flaw (bug), and provide feedback to the developer who would then repair the software code. However, as both the computing hardware and software development industries evolved the systems and accompanying software applications have grown to such staggering complexity that this debugging method is no longer viable.

Modern business software applications typically require multiple networked servers with both dedicated and networked access terminals spread across wide areas. These servers are often accessed over the internet by virtually limitless numbers of computers with web browsers. Complex transactions between these disparate systems are handled routinely over such networks. Consequently, complex software applications must be developed to handle these transactions and to keep vital business applications from failing. These complex software applications require vast teams of developers, each working on smaller portions of the application which must then be combined such that they work seamlessly with each other portion. This growth in complexity has caused the debugging process to evolve as well.

Software application testing seeks to uncover two types of errors: objective and subjective. Objective errors are relatively straight forward in that the software either works or it does not. However, these errors (bugs) can be difficult to uncover given that complex applications have an essentially limitless number of input combinations. For example, there may be only two obscure combinations of an essentially limitless number of input combinations that cause a bug to appear. Subjective errors are those that cause an end user of the application to be unhappy with the user interface or the application's operation. Locating subjective errors requires substantial user feedback, which adds considerable time to the application testing process.

Complex business applications require extensive testing before use in valuable business transactions. Because of the complexity of the applications, end user testing is not a viable means. Capture/playback was introduced to alleviate this problem. Initially, hardware devices recorded the manual keystrokes of a user. These recordings were then played back as test cases in order to test the software. While test cases were simple to create, this method proved to be inadequate due to the limited scope of the tests and the difficulty required in maintaining and documenting the testing process.

Software was subsequently utilized in an effort to overcome the shortcomings of the hardware capture/playback process. Software systems recorded test cases as scripts. These scripts could then be modified to increase the number of test cases possible, giving a much broader range of test coverage. Yet, these systems required even greater specialized development skills to create and maintain. Each time the underlying application would change, completely new and often additional test scripts were required. A given change in a software application required an exponential increase in the amount of software test scripts due to the multitude of new potential input combinations that could be exercised. Thus, this method was still too highly technical in nature and difficult to maintain and document.

More recently, automated testing solutions have evolved that utilize a framework approach for managing applications under test. This framework approach added a layer of abstraction to the underlying test case scripts. By abstracting the underlying scripts, automated test sessions could be brought within the realm of non-technical personnel. Through abstraction, underlying scripts could be pre-built and assigned "keywords" reflecting the functions performed (for example, "log on"). Thus, by merely combining keywords a non-technical person could assemble a specialized test case without the need for specialized programming experience.

Although test frameworks provided a dramatic improvement in testing efficiency and productivity, significant shortcomings still remain. A complex test session often requires combining hundreds of individual keywords. This can be extremely time consuming, inefficient, and thus expensive. Also, the framework abstraction still consists of underlying files with keywords and associated data elements. Users still often end up creating specialized test scripts to manipulate these files. In addition, the underlying scripts are often incompatible with different operating systems or programming environments and thus need to be continually recreated. Finally, the keyword framework approach still requires non-technical personnel to think like programmers in assembling the various keywords for a test session, impeding the adoption of this automated testing method as well.

Current automated test applications attempt to satisfy these shortcomings but fall short. The offerings range from free Open Source software to costly high-end applications. The Open Source applications emphasize flexibility by maintaining an open architecture. Thus, substantial specialized programming experience is required which negates its no-cost attribute. The high-end applications emphasize ease of use by even further abstracting the underlying test scripts. However, these applications are limited in the overall platforms they support due to the excessive abstraction they provide. In addition, the application to be tested must exist in order to generate test cases, delaying when testing can begin and consequently delaying the release of the application under test. Offerings in the middle of this range tend to require specialized programming experience due to the lack of sufficient abstraction.

All automated test applications require specialized test tool software applications that are developed for particular operating system environments. There are many third-party test tool applications available to handle the wide array of potential operating systems. Because these test tools are highly specialized, the framework approach to automated testing seeks to abstract the underlying test tool to shield the operator from the underlying complexities. Current automated testing applications still require development of special scripts to incorporate a particular third-party test tool. Thus, specialized programming knowledge is still required, limiting the usefulness of the automated testing application for non-technical personnel.

While automated testing is great for uncovering objective errors, it is not for subjective errors. Locating subjective errors still requires feedback from an end user by manually testing the application. Thus, automatic testing is not the panacea. A combination of automatic and manual testing is required for any comprehensive software test plan. Considering the shortcomings of the aforementioned testing methods, a need exists for a testing solution that allows for both automated and manual testing, ease of use for non-technical personnel, expandability and adaptability for technical personnel, flexibility in test case creation, and wide coverage of platforms and third party testing tools.

BRIEF SUMMARY OF THE INVENTION

The present invention overcomes many of the disadvantages of current automated software test applications by providing a single portal through which both technical and non-technical personnel alike can efficiently and effectively conduct software application testing.

It is one general object of the invention to afford flexibility as to where testing can occur. The invention can be utilized either on the computer hardware under test or else at a remote location. In this embodiment, the portal runs on a separate computer networked with the computer under test.

It is another general object of the invention to improve the flexibility of the automated testing process. Instead of merely limiting the usefulness of the automated testing interface to automated testing only, the current invention also provides manual testing capabilities. This affords a more efficient means of uncovering both objective and subjective errors in the application under test.

It is another general object of the invention to minimize the costs and difficulty associated with developing and maintaining test scripts. The invention features an interface which abstracts the underlying test scripting process through the use of a graphical user interface (GUI). The GUI readily allows creation of sophisticated test scenarios by allowing the user to graphically combine keywords representing underlying test scripts.

It is yet another general object of the invention to achieve third-party test tool neutrality. The invention incorporates an automated script-generating server that works with all third-party test tools. Thus, the underlying test tool can remain hidden from the user, providing a more non-technical user friendly test environment.

It is yet another general object of the invention to provide a generic interface that allows for testing applications on any computing platform.

The invention accordingly comprises the features described more fully below, and the scope of the invention will be indicated in the claims. Further objects of the present invention will become apparent in the following detailed description read in light of the drawings.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein.

Figure 1:
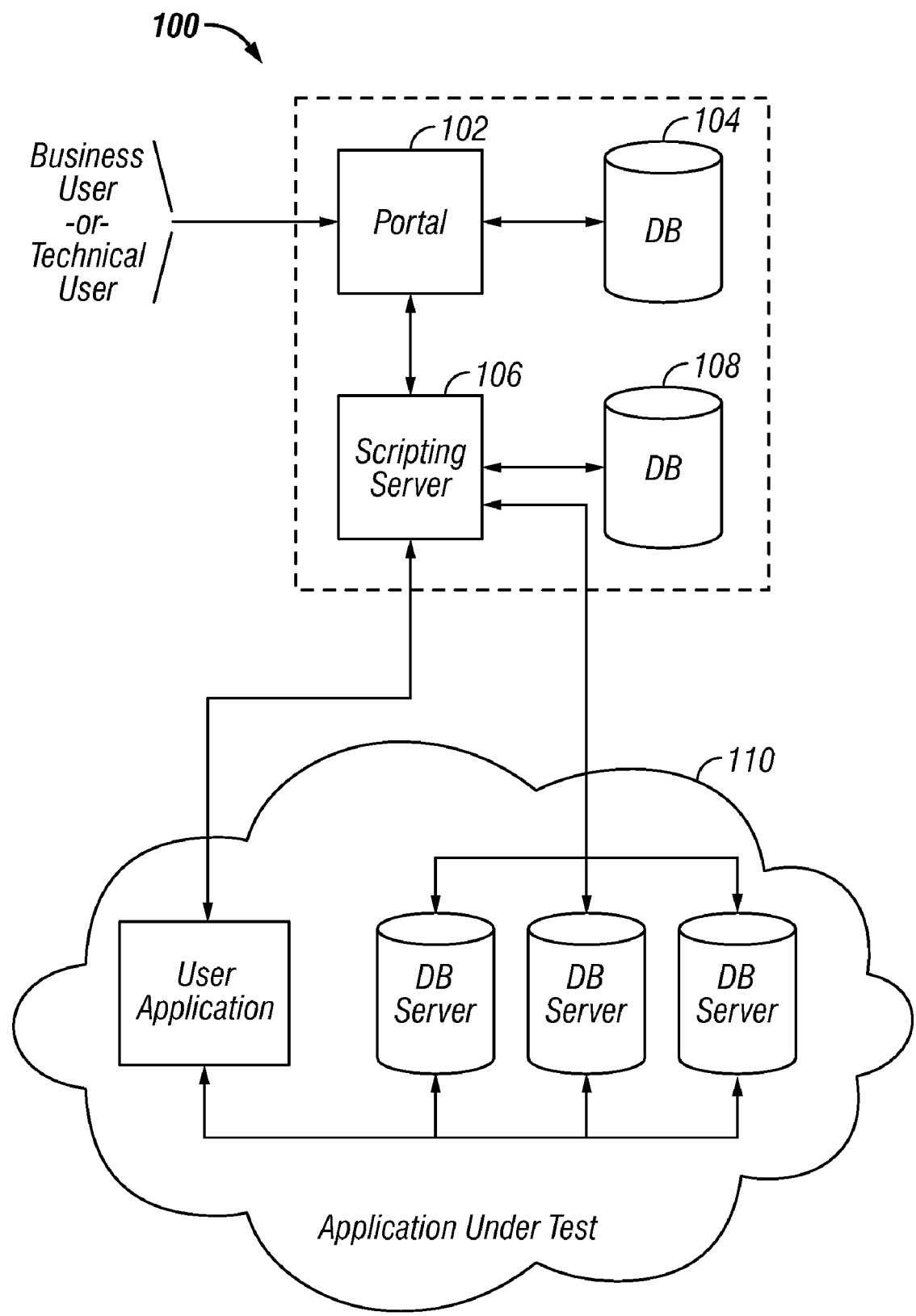
FIG. 1 is a block diagram representation of an embodiment of the present invention as it would function in actual use.

Where used in the various figures of the drawing, the same reference numbers designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, and relationship of the parts to form the preferred embodiment will be explained or will be within the skill of the art after the following teachings of the present invention have been read and understood.

DETAILED DESCRIPTION OF THE INVENTION

FIG. 1 presents a high-level block diagram of an embodiment of the present invention as it would be employed to test a user's software application 110. The integrated test system 100 consists of a portal 102 with an associated portal database 104 and a test tool script server 106 with its associated script server database 108. A user (either technical or non-technical) interfaces with the test system 100 through the portal 102, which in turn interfaces with the user application under test 110 through the test tool script server 106. A typical user application under test 110 would be a business system built to handle credit card or other critical financial transactions.

Figure 2A:
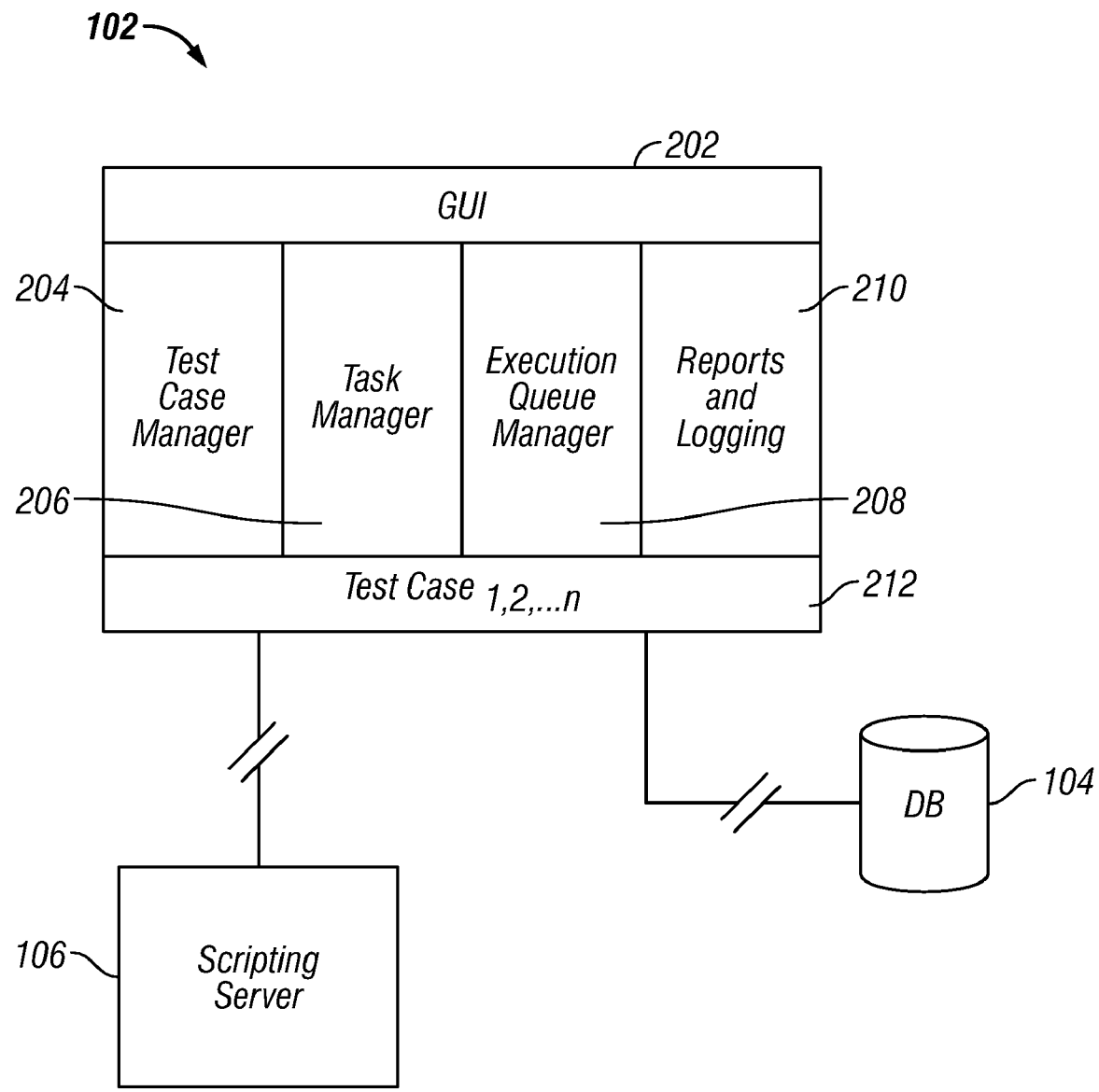
FIG. 2 is a hierarchical representation of the major functions of the embodiment of the present invention as represented in FIG. 1.
Figure 2B:
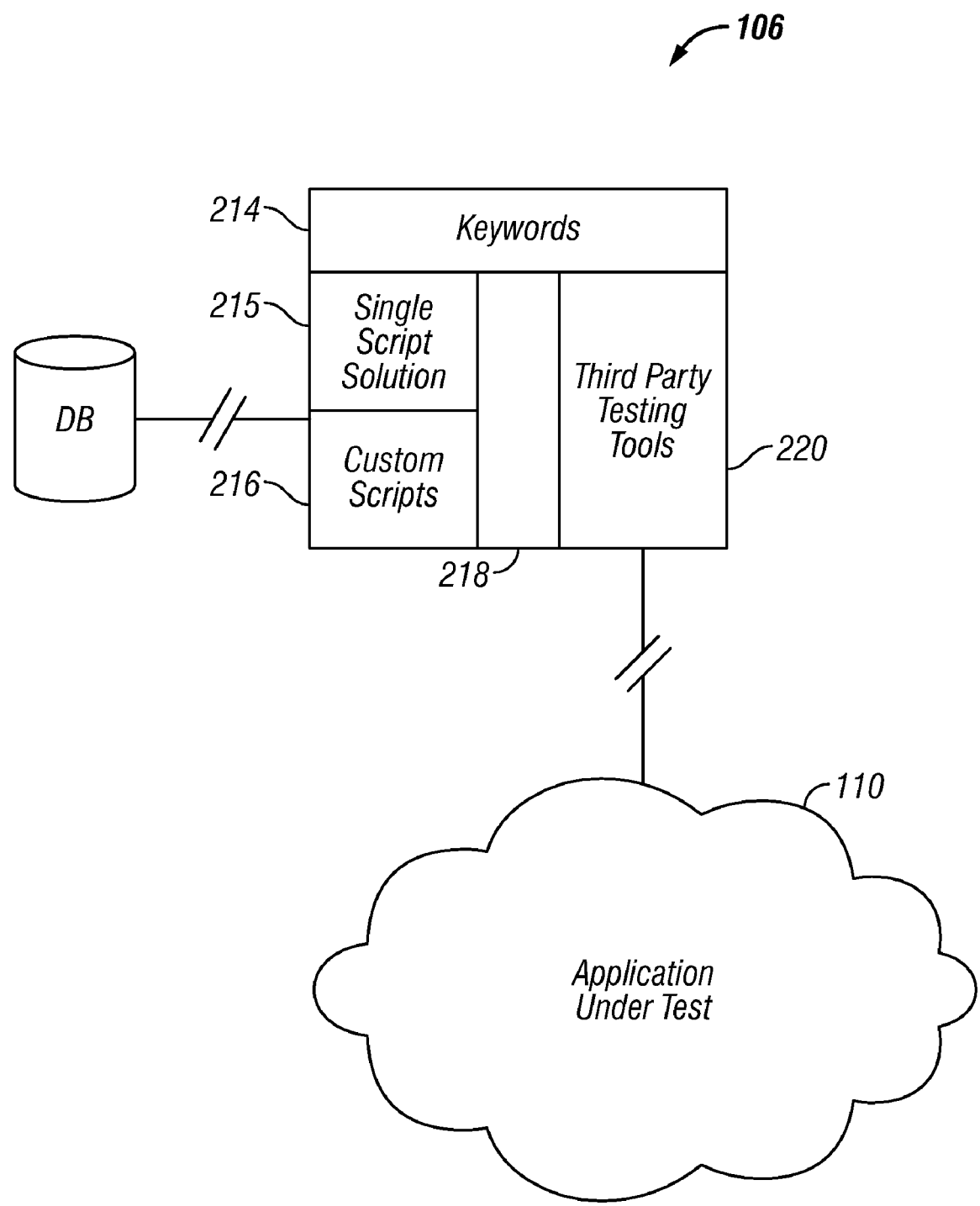

FIG. 2 represents one embodiment of the present invention. Specifically, FIG. 2A presents a hierarchical representation of the key functions of the portal 102 along with the portal database 104. Likewise, FIG. 2B presents a hierarchical representation of the key functions of the test tool script server 106 along with the script server database 108. Each of these test system 100 components is designed from software to be run on a dedicated or shared computing platform running a common operating system such as Windows®. The only requirement for individual systems hosting separate test system 100 components is that the systems are networked together. Because the system is software based, one skilled in the art will understand that the underlying software can be adapted to run on other operating systems (such as UNIX®) without departing from the actual spirit and scope of the invention.

The test system 100 components (portal 102, portal database 104, script server 106, and script server database 104) can each run on their own separate computing platform. This modularity allows for increased flexibility in the types of hardware that can handle automated testing. For instance, common desktop personal computers or small laptops have sufficient processing power and resources to manage all of the components collectively, so long as the test cases being generated and run are relatively few. If the testing situation should require additional processing power, each of these test system 100 components can be isolated and run on its own dedicated computing platform.

Referring to FIG. 2A, at the top level of the portal 102 is the graphical user interface 202 (GUI). The GUI 202 provides an interface means to allow both technical users and casual business users to operate the test system 100. In the present embodiment, the GUI 202 is designed using the Windows® .NET™ Framework API. This provides for an interface that is consistent with others that non-technical business users are familiar with. Also, the .NET™ Framework allows for remote access to the test system 100 from essentially anywhere so long as the portal 102 and test tool script server 106 are networked together. This precludes the need for any specialized client-side components to support the interface. FIG. 8 provides examples of the GUI 202 as experienced by the user. By providing a consistent look and feel, the GUI 202 reduces the technical knowledge required to manipulate the test system 100. In addition, making the GUI accessible from any machine that can support an interface makes the test system 100 more flexible and efficient to use.

Figure 8A:
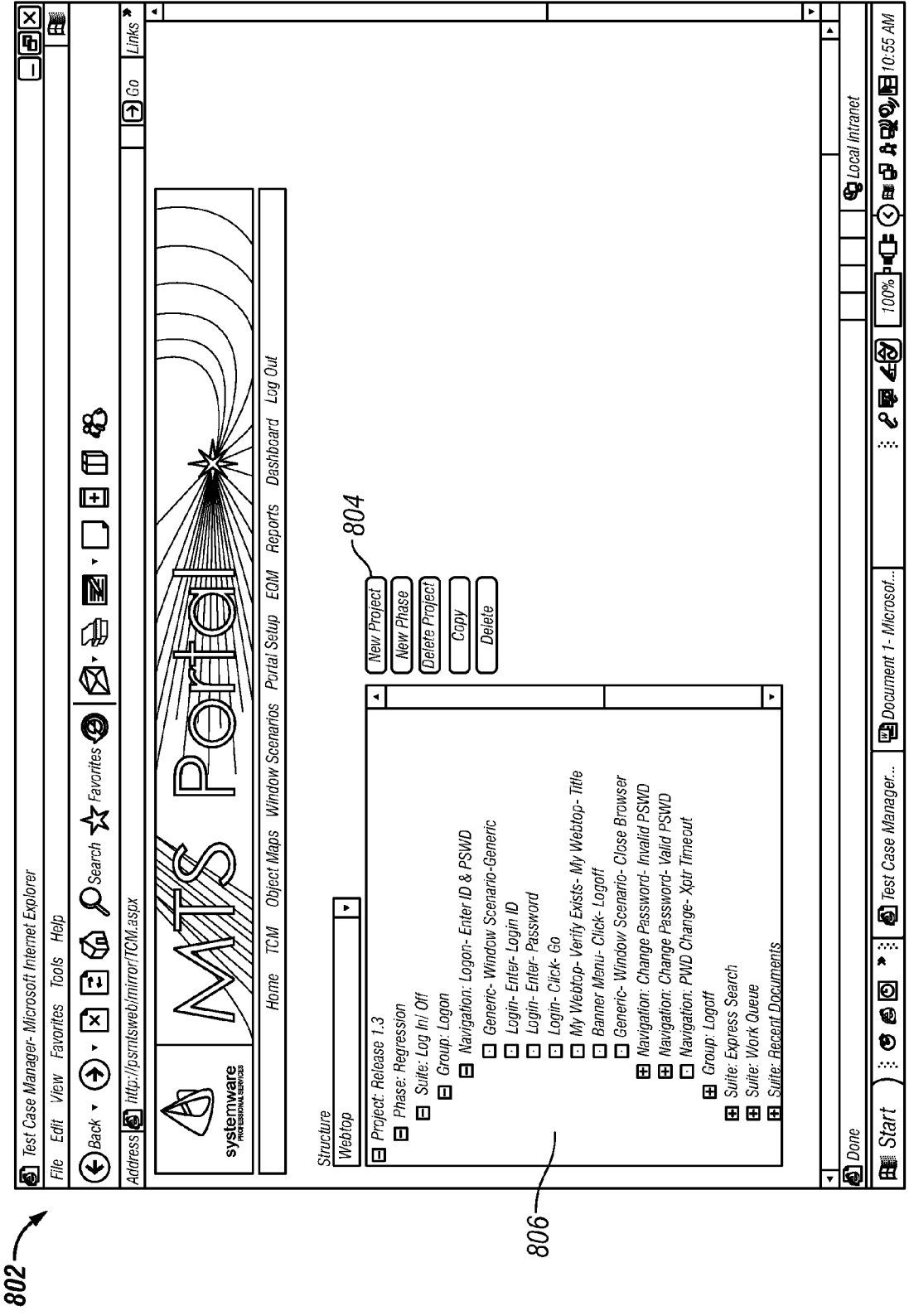
FIG. 8 presents several screenshots of the Graphical User Interface of an embodiment of the present invention as it is used to configure the system and test a user application.

The test case manager 204 is the main interface for a user to operate the test system 100. FIG. 8A provides a screenshot of the test case GUI 802 as it appears in the current embodiment. This interface presents to the user a graphical hierarchical view 806 of current projects, project phases, and associated test cases 212. In addition, test projects and project phases can be created or destroyed 804. Details follow on how this test case 212 hierarchy is established.

Figure 8B:
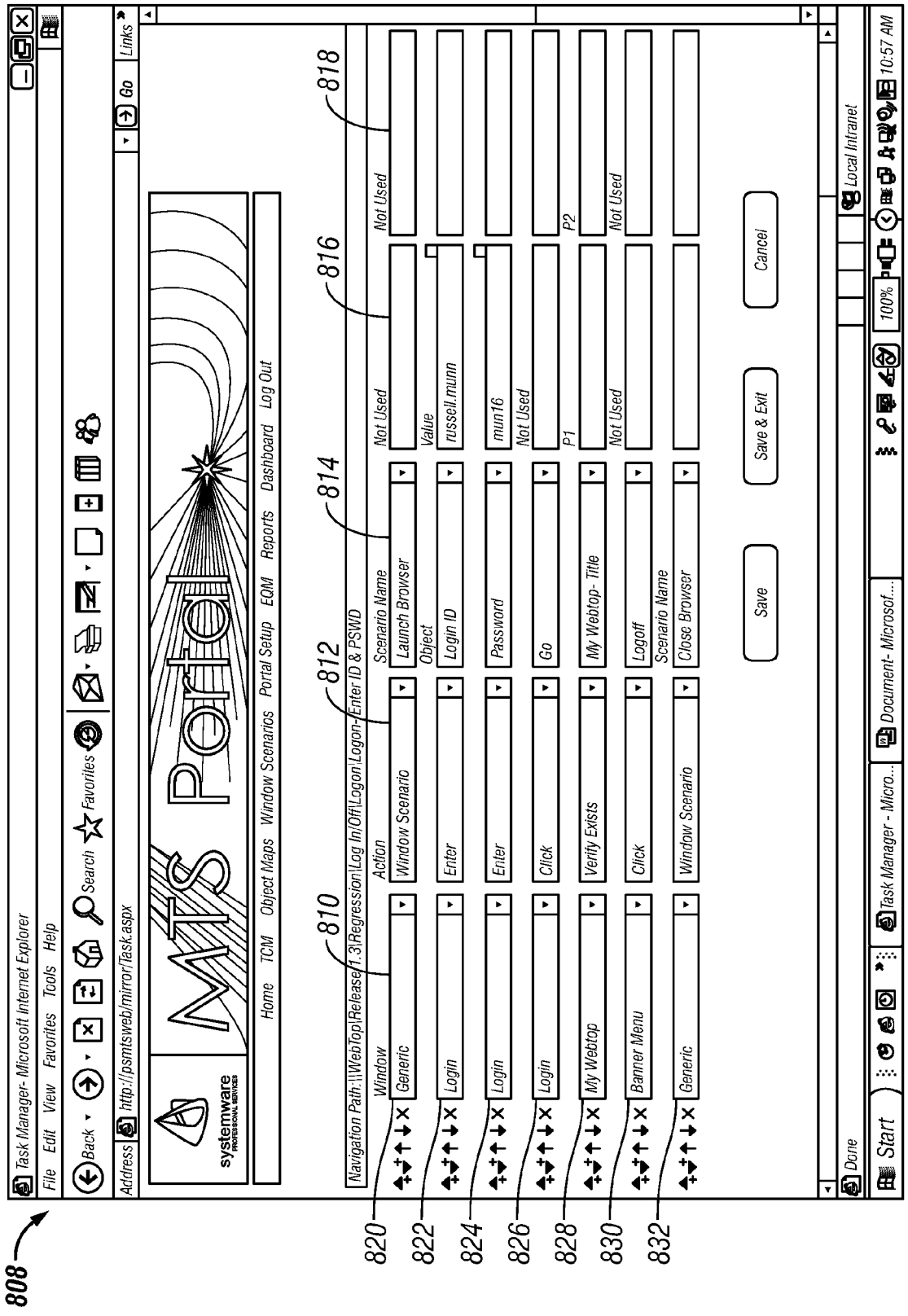
Figure 8C:
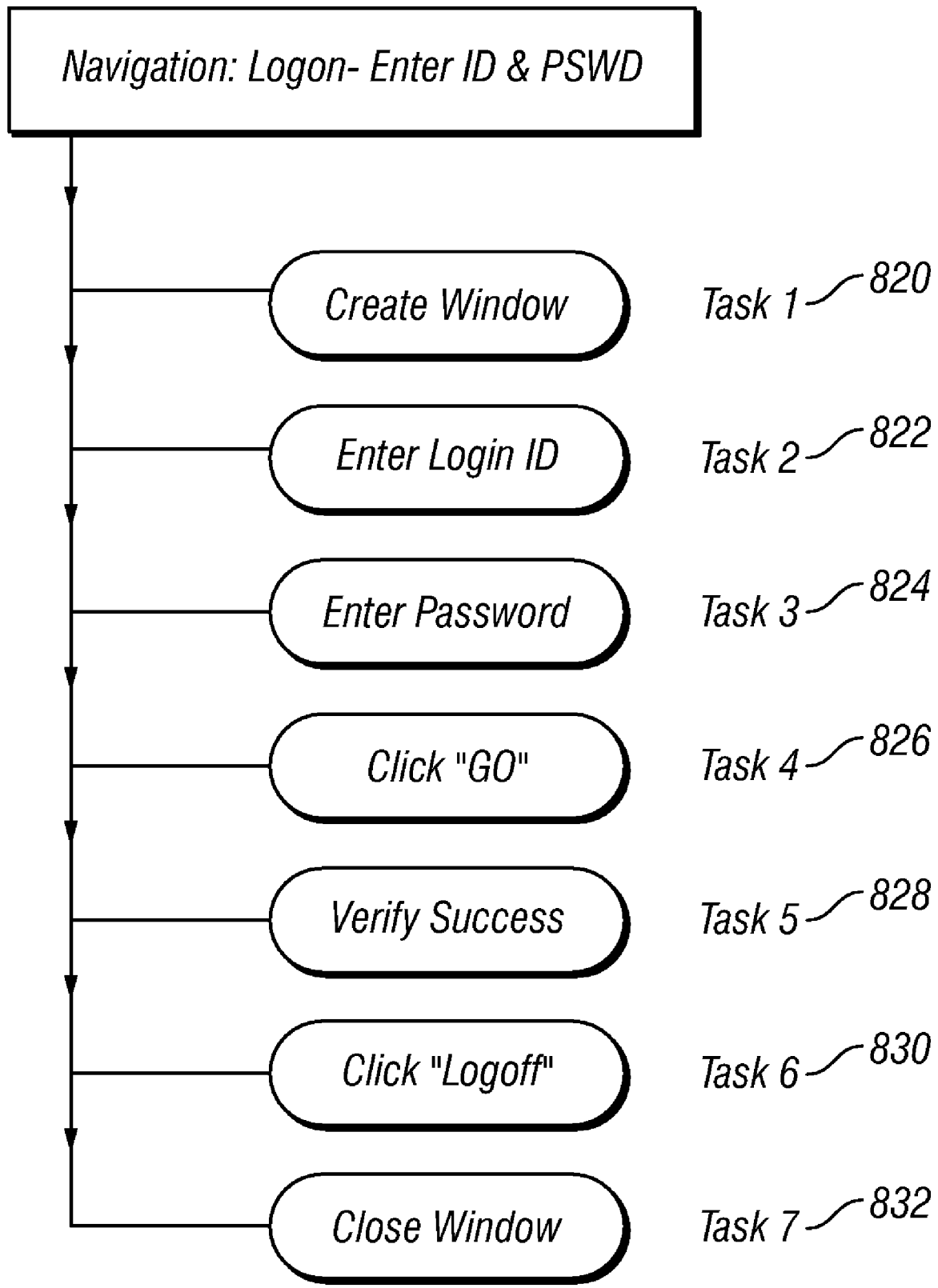

The task manager 206 layer handles details associated with the creation of actual test cases. FIG. 8B provides a screenshot of the task manager GUI 808 as it appears in the current embodiment. This interface allows manipulation of the individual tasks associated with each test case 212 (as displayed in the test case GUI 802). Tasks are displayed in a row/column format and can be readily edited.

The test execution queue manager 208, as the name implies, handles actual test execution. Once a test case hierarchy and associated test cases are created, the execution queue manager 208 allows the user to control the actual test execution (i.e. starting, stopping, and rerunning existing tests).

The report generator 210 captures actual test execution data for later review. FIG. 8H provides a screenshot of the report GUI 892 with output from an actual test. These reports can be tailored in content and can be displayed on any machine that supports the report GUI 892. Information from a test run is stored as records in the portal database 104. In addition to pass/fail statistics, the report generating layer captures actual user application screenshots along with environmental and machine variables during actual test execution.

A unique feature of the present embodiment is its ability to collect data on test coverage. Each object that is represented in the object map is monitored during test case creation to determine how often it is utilized by the test cases. For instance, if a test case never accesses a particular object, a report will reveal that the object was "not covered" 896. Likewise, when an object was included within a test, a report is generated that reveals that the object was "covered" 894. This allows a user to more adequately and completely test a system by providing an indication of the thoroughness of a given test.

Once the system user engages the execution queue manager 208 to begin testing, test cases 212 are fed to the script server 106. FIG. 2B shows the scripting server 106 block diagram. The scripting server 106 consists of a keyword layer 214, a single script 215 and a custom script 216 layer, an API wrapper 218, and associated third-party test tools 220. The combination of these layers abstracts the complexity associated with utilizing third-party test tools only, and presents a common (suggest this be more specific—like more English-like, more business-like) keyword-based interface for more generic (suggest simplified, easy to use, more universal instead of more generic) test case 212 creation.

Beginning with the third-party test tool layer 220, the script server 106 in the present embodiment provides flexibility and adaptability to any computing platform for which a third-party software test tool is available. Even custom test tools developed by the user are configurable for use with the script server 106. By providing a custom API wrapper 218 and custom scripts, any test tool is supportable.

Because user applications under test 110 typically use common operating system components, every third-party software test tool functions in a similar manner with similar types of API calls. Therefore, there are significant similarities between the third-party software test tool APIs that can be combined under the API wrapper layer 218. For instance, a common function of every software test tool is to locate an "OK" button on a GUI and "click" it. Thus, each third-party software test tool will have a slightly different API call to provide this common functionality. To abstract these slightly different API calls to a generic keyword common to all test cases 212 requires a custom script 216. Thus, a general keyword at the keyword layer 214 can activate a single script 215 or custom script 216 solution which can then cause the same function to be performed at the user application under test 110 regardless of the third-party test tool 220 that is being utilized. The current embodiment stores the keywords and custom scripts in a script server database 108 for efficient use and reuse.

The script server 106 in its present embodiment can be run from any location so long as the computing platform on which it runs is networked with the user application under test 110. When a test is running, the script server 106 generates output relating to the current test case and displays it on the computing platform's monitor. Consequently, test execution can be monitored while a test is actively running.

Figure 3:
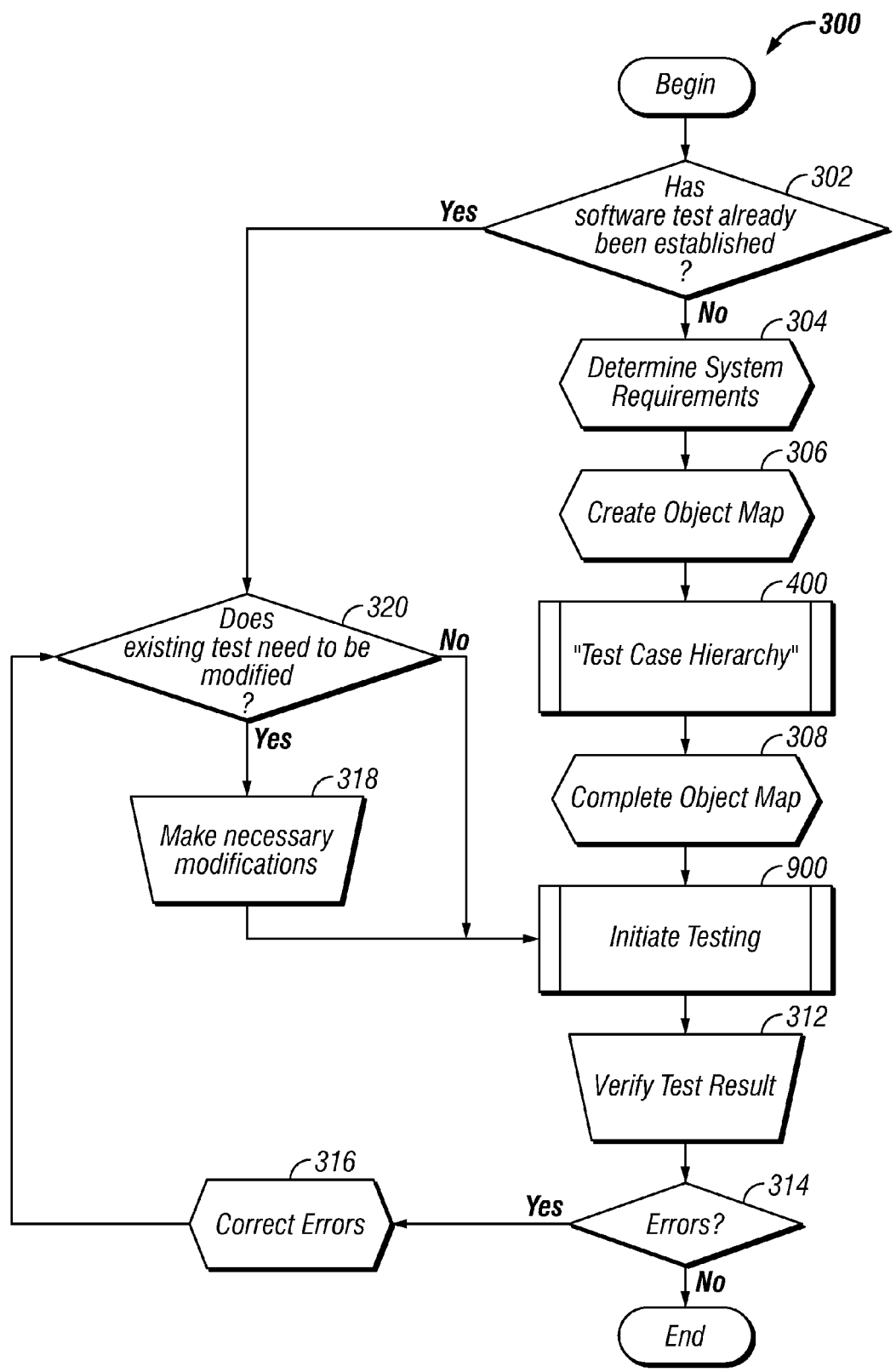
FIG. 3 is a flow diagram representing proper utilization of an embodiment of the present invention, from initial configuration to actual testing.

FIG. 3 provides an overall system flow diagram 300 of the actual operation of the test system 100. The steps presented reflect those taken by a user to configure and execute test cases against a user application. Because of the level of abstraction provided in the current embodiment, a minimum level of technical knowledge is required to conduct testing using the present invention.

To begin with, a user has an application that needs to be tested. If this is the first time the test system 100 has been used, then a test must be configured. However, if tests have already been run, then there may be sufficient test cases available that may only need to be modified instead of recreated. Thus, the first step is to determine if a software test has already been established 302. If a test already exists for the user application, then a determination is made as to whether the test needs any modifications 320. If so, the necessary modifications must be made 318. If no test presently exists, then a determination must be made as to the requirements to test the system 304.

Non-technical business users (BU) typically make the determinations of system requirements for test 304 with minimal assistance from technical experts (TE). Typically, the BU will decide what areas of the application will be tested, such as the user interface and/or the application's API. Once this determination is made, the BU might consult with a TE to ascertain whether the testing proposed is feasible or sufficient.

Once the BU has determined the system requirements 304, the object map is created 306. In the present invention, object maps abstract the complex physical name of an object to provide a more meaningful and simple to use logical name representing the object. This logical name may either be terse or in natural language. Natural language logical names are more intuitive and aid in simplifying test case creation.

By abstracting the physical names of an object to a more useable logical name, less technical expertise is required to create test cases. For example, a test case may need to perform a login function on a website application. With the proper object map association, the test case need only refer to the "login" object to access it regardless of the object's underlying physical name. This allows a BU to create a test case without concern about where the underlying object is actually mapped. A TE can later associate the logical name to any proper physical name the TE chooses.

Figure 7:
FIG. 7 is a spreadsheet depicting proper creation of an Object Map for use in configuring the system. Three different types of entries are shown.

FIG. 7 presents an object map 700 created using an Excel® spreadsheet. An object map 700 can be created in this fashion and then imported into the test system 100, or it can be created within the object map GUI 864, as shown in FIG. 8F. With the spreadsheet method 700, each complete object is presented in a row, and contains entries for the import type 708, the object map name 710, the window logical name 712, the window physical name 714, the object type 716, the object logical name 718, the object physical name 710, and the object type 722.

An object must be associated with a particular window. For ease of use and reusability of test cases, the associated window is also given a logical name 712 as well as a physical name 714. Spreadsheet entry 706 shows an object with a logical name 718 "Add to Active Indexes" associated with a physical name 720 of "Caption='add to active indexes'." Creation of the physical name 720 can be left to one with greater technical expertise. Entry 704 shows an object with a logical name 718 "System Name" associated with a physical name 720 of "generic." This serves as a placeholder until the physical name is later determined.

Figure 8D:
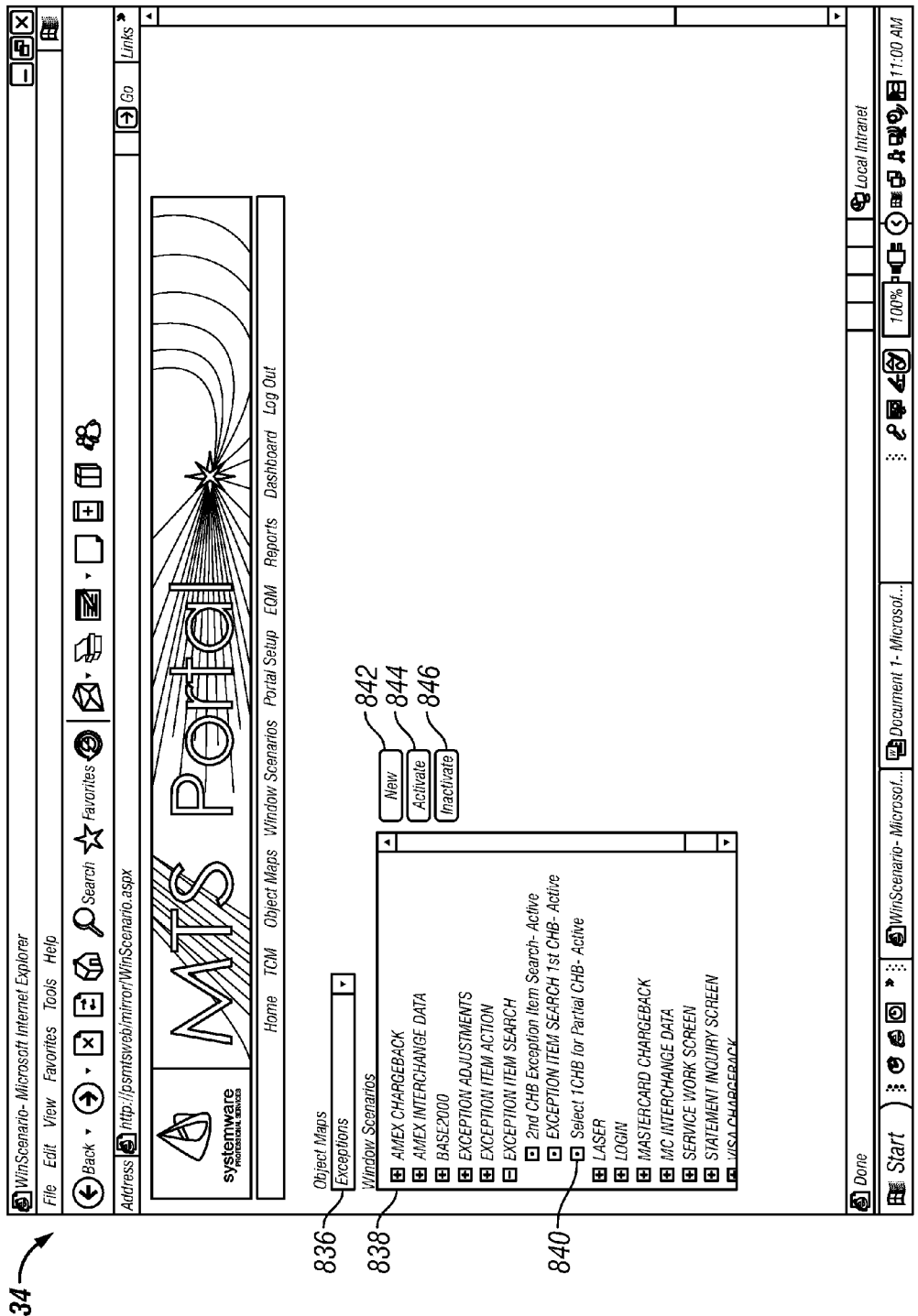
Figure 8E:
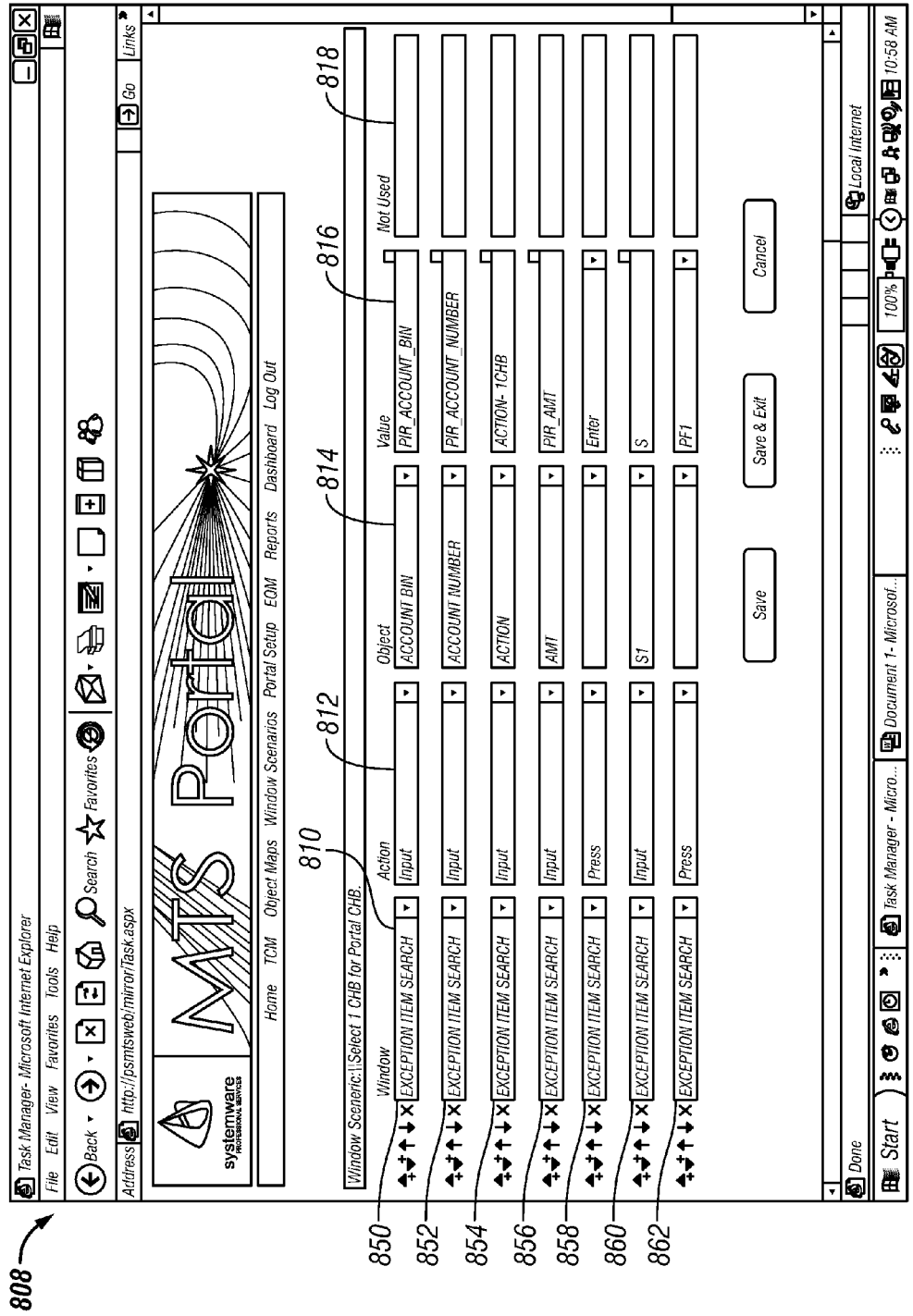
Figure 8F:
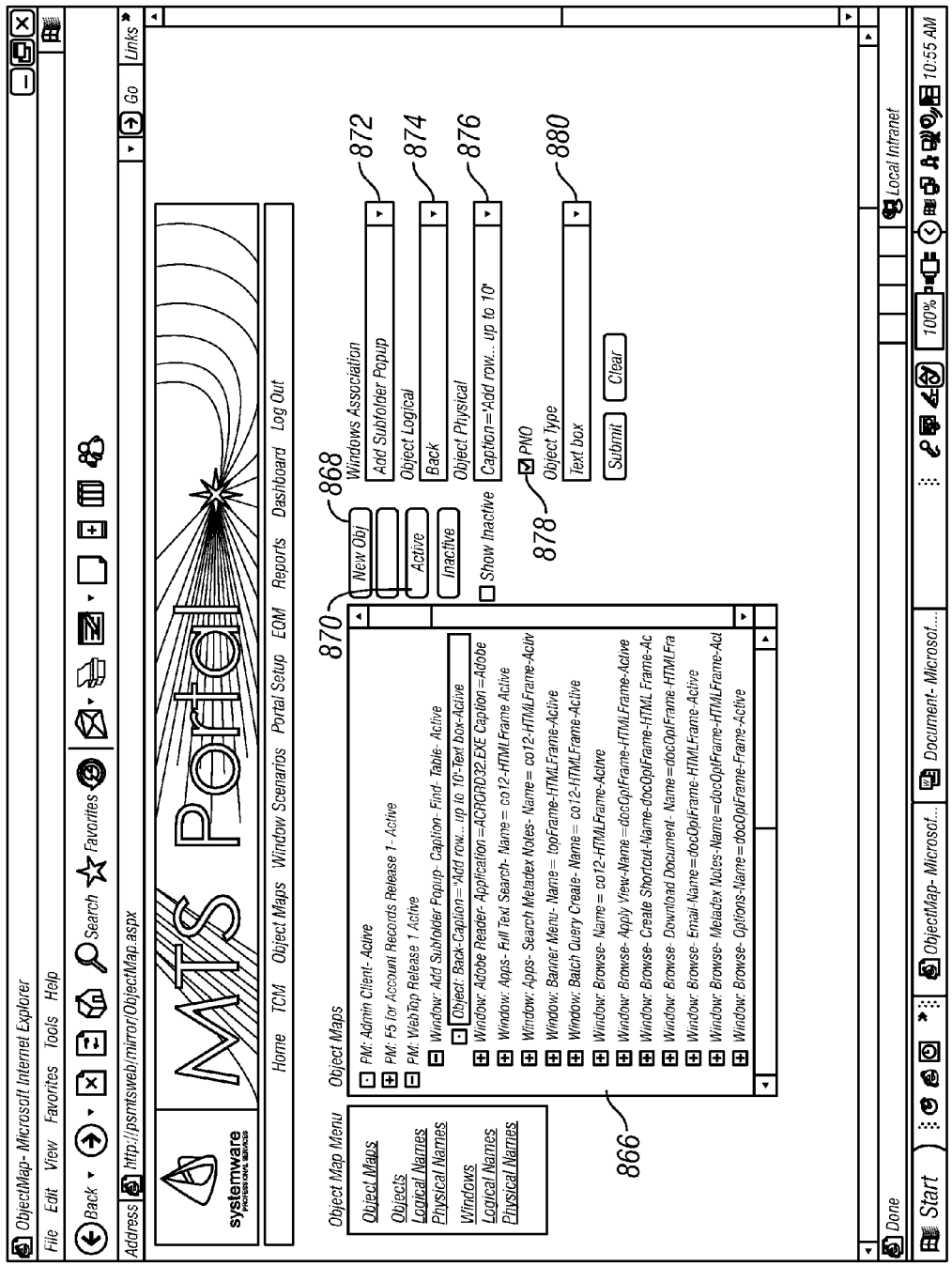

FIG. 8D shows the object map GUI 834 as it appears when it is displaying the object maps available on the test system.

From this interface, entire maps can be filtered 836, activated 844, or inactivated 846. Selecting new 842 allows creation of new object maps. For a given object map, if it is inactivated 846 it is no longer available to the BU for test case creation. In doing this, the present embodiment filters much of the complexity involved in test case creation because the BU need not be faced with inapplicable object maps.

FIG. 8F shows a screenshot of the object map GUI 864 being used in the creation of an object map. Any available object maps are displayed 866 in a sorted format and can be modified, activated, or inactivated 870. The object map GUI 864 shows a particular object map with a highlighted object 866. The object map is named "WebTop Release 1," and shows that it is "active" and can thus be utilized by the BU in test case creation. Further, this object map contains a window whose logical name is "Add Subfolder Popup" and whose physical name is "Caption=Find" 866. The highlighted object was created by selecting "New Obj" 868; associating it with the window 872; entering a logical name 874 and a physical name 876; and selecting and object type 880. To allow the BU to utilize the object, it is made "active" 870, or else it can be made inactive to prevent use. By allowing inactivation of particular objects, it is possible to limit the choices available to the BU, which makes the task of test case creation more manageable.

Another unique aspect of the present invention is that the user application to be tested 110 need not be complete to begin creation of test cases 212. Because the object map provides for a means of abstracting the physical object name to a more useable logical name, the physical name can be ignored until it becomes known. The object map spreadsheet 700 in FIG. 7 features an entry 704 representing such an object. In this object 704, the chosen physical name 720 is "generic". This serves as a placeholder for using the object map to complete the test case hierarchy without the actual physical object being available. In a test case, all that is necessary to refer to the object is the object logical name 718. Once the object becomes available, this object physical name 720 entry can be changed from generic to the actual physical name and the test can be run. Because the object map need not be completed to perform test creation, a BU can make the initial entries without worrying about the more technical physical object mappings. Thus, less technical expertise is required to begin test case creation and the more technically demanding work can be left to the TE, which can be performed at a later date. This allows for simultaneous application development and creation of corresponding test cases. Because the development can occur concurrently, an application can begin testing as soon as it is available and the time to market is greatly reduced.

Figure 8G:
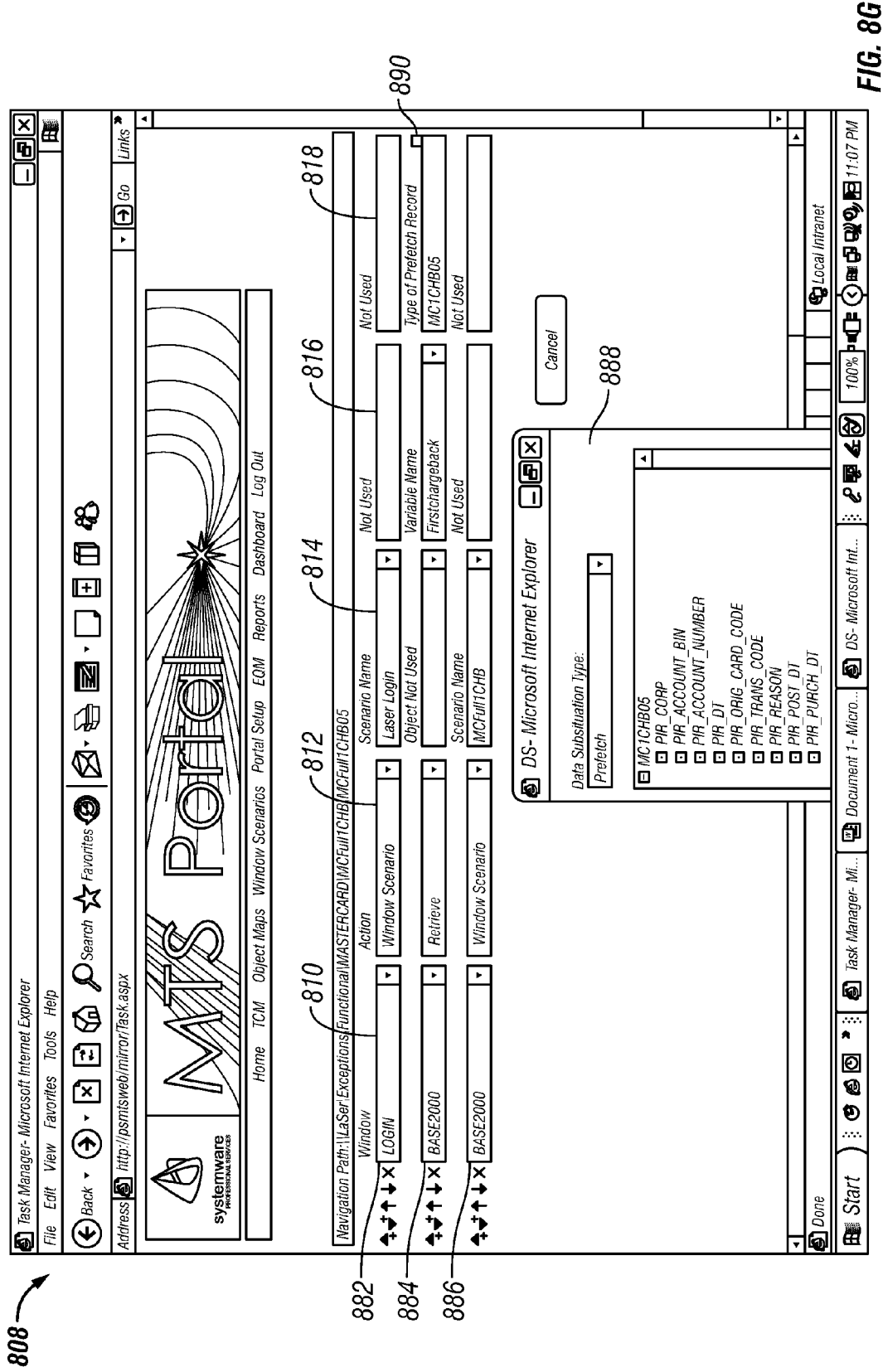
Figure 8H:
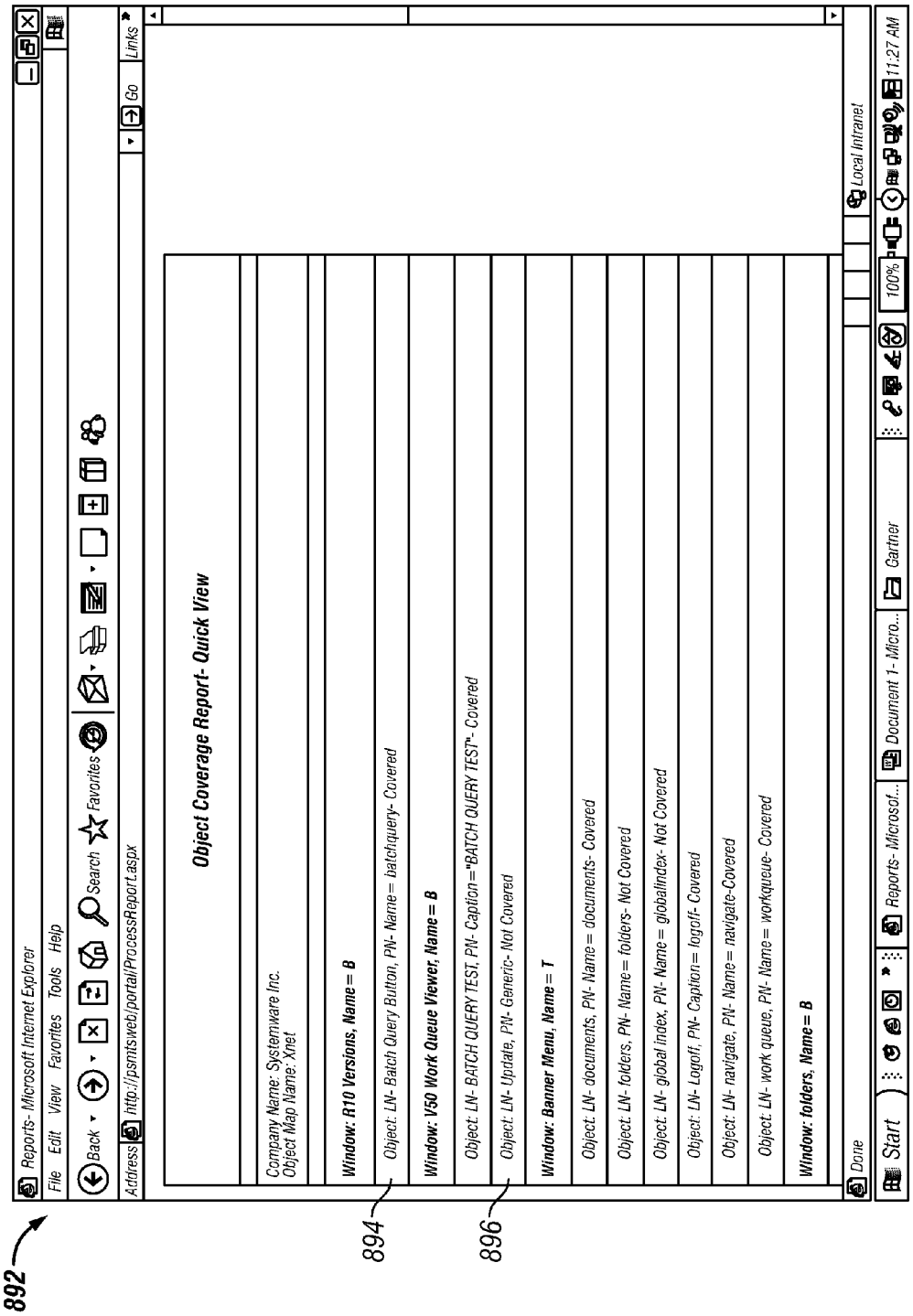
Figure 8I:
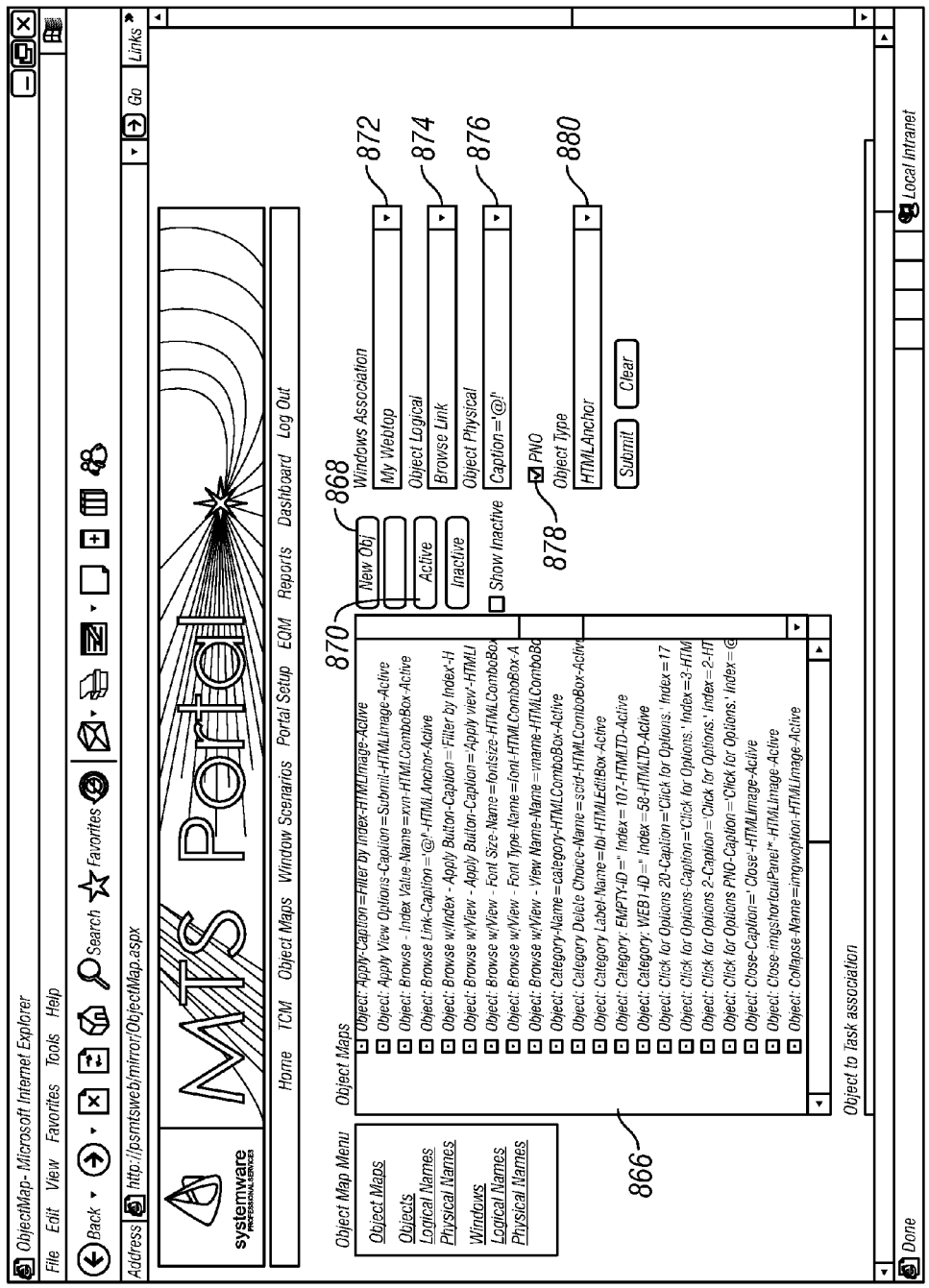

Referring to FIG. 8I, one embodiment of the present invention makes it possible to override the object name in a test case by selecting physical name override ("PNO") 878 in the object map GUI 864. By overriding the object's physical name, the object can assume on the attributes of the data requested. For example, with an HTMLAnchor Object Type 880, the requested object data is a dynamic link which cannot be determined before runtime. By overriding the object's physical name with a dynamic link, the object now takes on the attributes of the dynamic link and can be tested as can any other object.

Figure 8J:
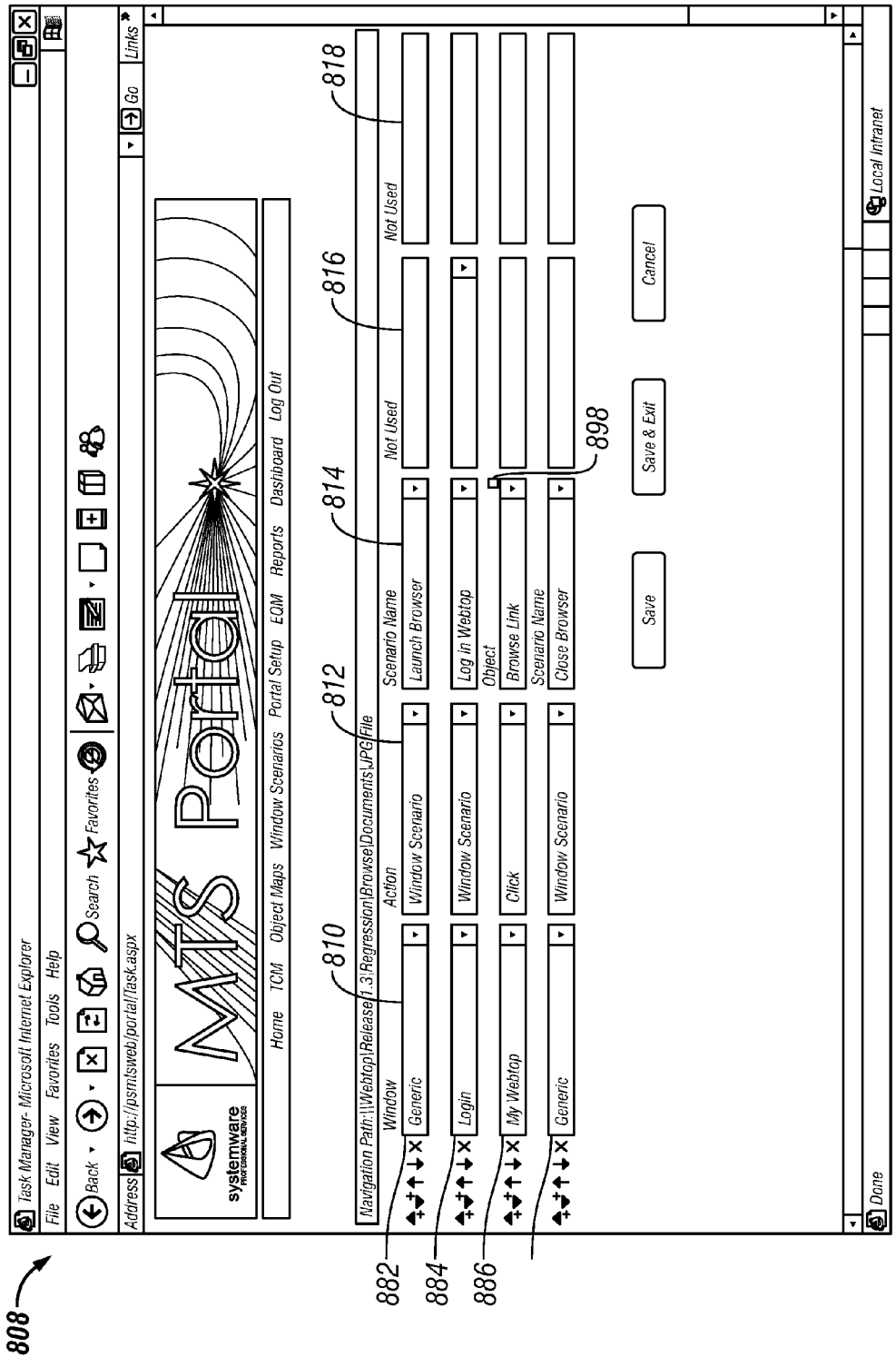

FIG. 8J highlights a task 886 whose object 814 is designated for physical name override 898. Because the object was designated as "PNO" in the ObjectMap GUI (see FIG. 8I, 878), a small box 898 is visible immediately above the Object column 814. From this Task Manager interface 808 a user can tell when an object has been selected for PNO. In the Object- Map interface 864 of FIG. 8I the Object Physical 876 name and Object Logical 874 name are shown. In this instance, the Object Type 880 is an HTML Anchor which requires dynamic link data as the physical name. The Object Physical 876 name shows "Caption='@!'." The "@!" serves as a placeholder for the actual dynamic data generated at runtime that represents the true physical object name (in this case, an HTTP link). The system merely captures the true dynamic link data and substitutes it for the "@!" placeholder. Thus, the user need only access the "Browse Link" logical name 874 during task creation 886 and need not be concerned about the actual physical name 876.

The physical name override feature is unique because it allows the system to work with essentially any type of dynamic data instead of requiring all object physical name entries to be hard coded ahead of time. One skilled in the arts will appreciate that other types of dynamic data can be substituted for the physical name of an object using the present embodiment. For example, the location of the objects on a dynamically constructed interface may be determined by the outcome of a given test case. The test case can save the dynamic location data to persistent storage. To access the object, the physical name data may be pulled from the storage at runtime and substituted as the physical name of the object.

Another example of data that is capable of physical name override would be data which is stored in a table format (row/column). Typically, each row in the table can be accessed using an index value. Without physical name override, each row would have to be setup as an object in the object map. However, with physical name override it is possible to setup a single row object. The data in each row can then be obtained using the single row object by overriding its physical name to iterate through the rows.

Figure 4:
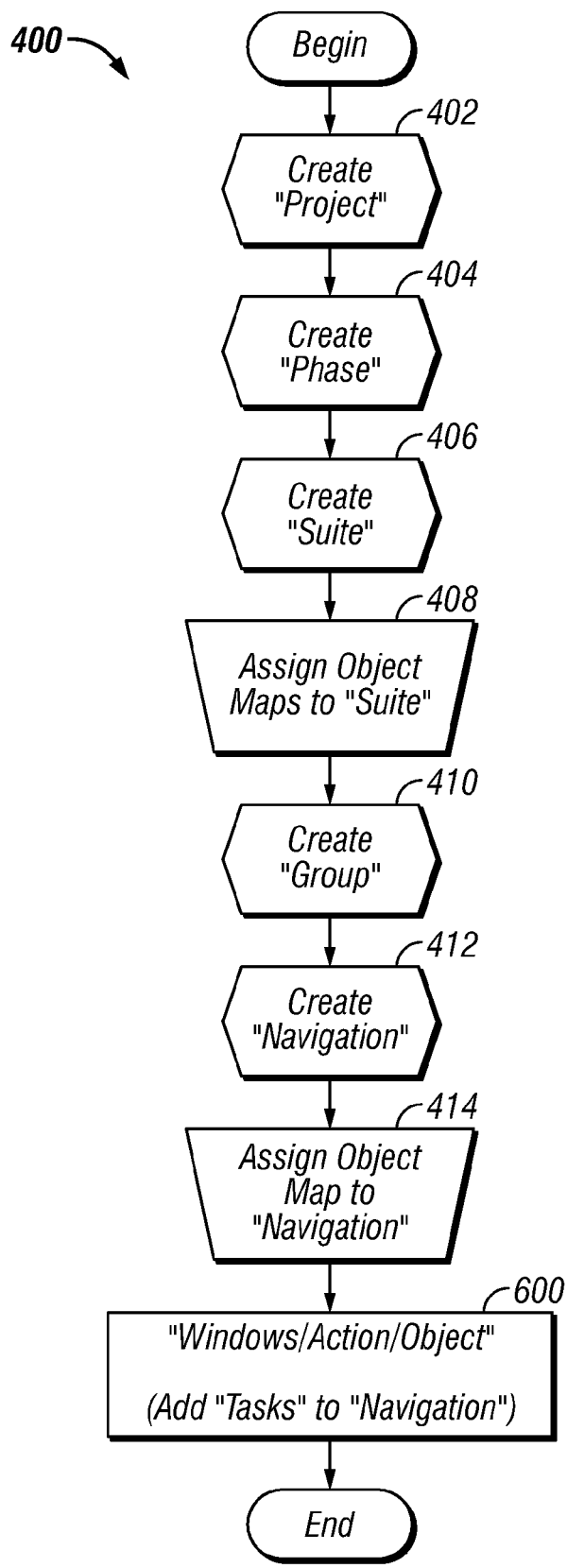
FIG. 4 is a flow diagram representing the steps necessary for proper creation of the Test Case Hierarchy as introduced in the flow diagram of FIG. 3.
Figure 5A:
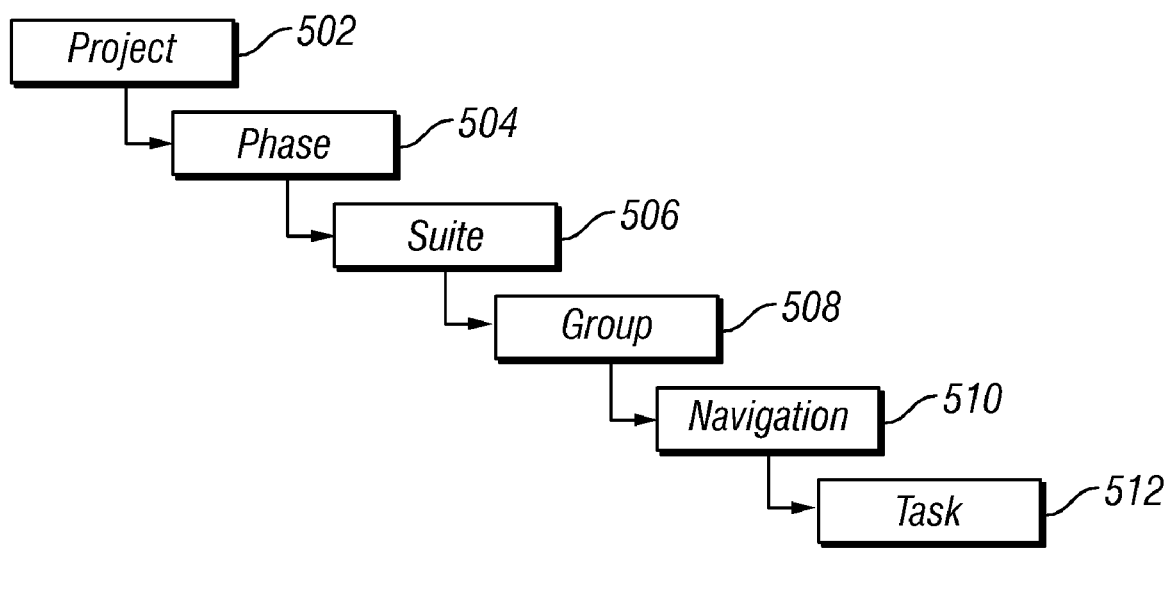
FIG. 5 is a representation of the Test Case Hierarchy presented in FIG. 4 as utilized by an embodiment of the present invention.
Figure 5B:
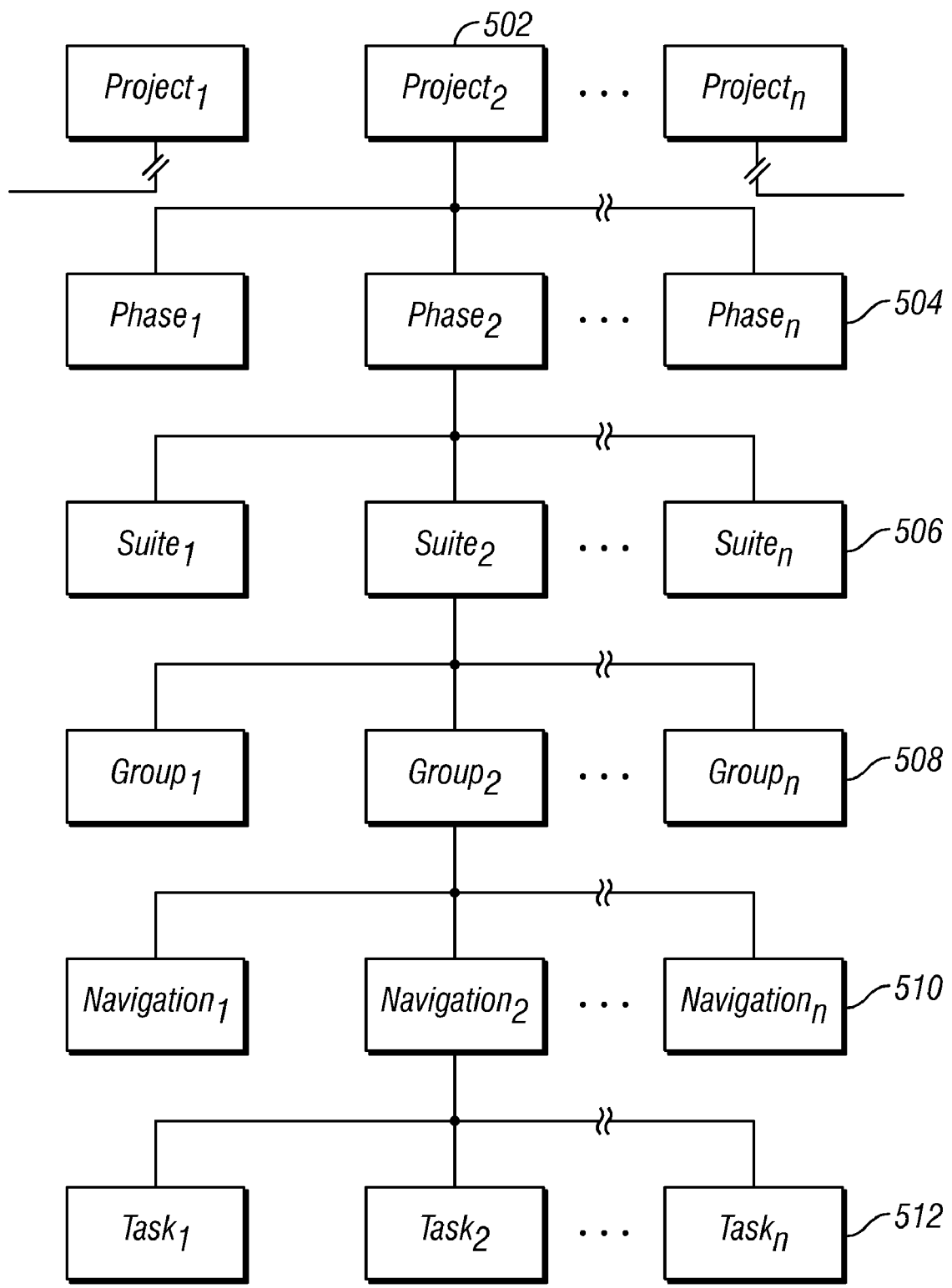

Turning again to FIG. 3, once the object map is created 306, a test case hierarchy 400 is required. This is where the actual test case flow is established. FIG. 4 shows a flow diagram representing the steps required to establish a test case hierarchy 400. For further illustration, FIG. 5 depicts the test case hierarchy elements and how they interrelate. There can be a virtually limitless number of each element. However, a group of Tasks 512 must be associated with a Navigation 510. A group of Navigations 510 must be associated with one Group 508. A group of Groups 508 must be associated with one Suite 506. A group of Suites 506 must be associated with one Phase 504. And, a group of Phases must be associated with one Project 502. There can be multiple projects 502 defined as well.

The first step in establishing the test case hierarchy is to create a project 502. Referring to FIG. 8A, this is accomplished in the present embodiment by using the test case GUI 802. Selecting "New Project" 804 allows the BU to create a meaningful name that reflects the current project state. For example, the project shown is titled "Release 1.3" 806. The test case manager 204 allows for the creation of multiple projects 502 depending on testing needs.

A phase 504 is created once the project 502 is named. Typically, a name is chosen that reflects the phase of the current testing (i.e. "integration" or "regression" or "release"). FIG. 8A shows that project "Release 1.3" has a phase titled "Regression" 806. The creation of multiple phases 504 is also supported by the test case manager 204.

A suite 506 is named once the phase 504 is established. A suite 506 is essentially a container of test cases, and is typically given a name that reflects the aggregate of these cases. FIG. 8A shows several suite 506 entries beneath the "Regression" phase 806. The suite that is further expanded is named "Log In/Off" to reflect the two test cases contained within the suite. The creation of multiple suites 506 is also supported by the test case manager 204.

Object maps that are relevant to the particular test cases are assigned to a suite 506. This serves as a means to filter certain object maps that are not applicable. Consequently, this simplifies the task of test case creation by limiting the choice of object maps available to the BU.

A group 508 is named as a test case beneath a given suite 506. Each suite 506 can contain multiple groups 508. The group 508 is typically named to reflect the purpose of the test case. FIG. 8A shows that the "Log In/Off" suite contains two test cases 806. The first case is the "Logon" group and the second is the "Logoff" group.

A navigation 510 is named beneath a given group 508. A navigation 510 is typically named to describe the test case steps that it represents. FIG. 8A shows that the "Logon" group 508 contains four navigations, with one of them named "Logon—Enter ID & PSWD" 806. This reflects the fact that the underlying test case steps perform a login function by entering the ID and password of a simulated user.

While multiple navigations 510 may be named beneath a given group 508 in the present embodiment, only one object map may be assigned to any given navigation 510. By limiting the navigation 510 to one object map, only the relevant objects are available from which to form a test. This simplifies the task of creating a test case by limiting the choices the BU faces.

Tasks 512 are created beneath a given navigation 510. Each task 512 is the equivalent of a step in a given test case. FIG. 8A shows seven tasks beneath the "Logon—Enter ID & PSWD" navigation 806. Each task utilizes an object available in the object map assigned to the navigation 510.

Figure 6:
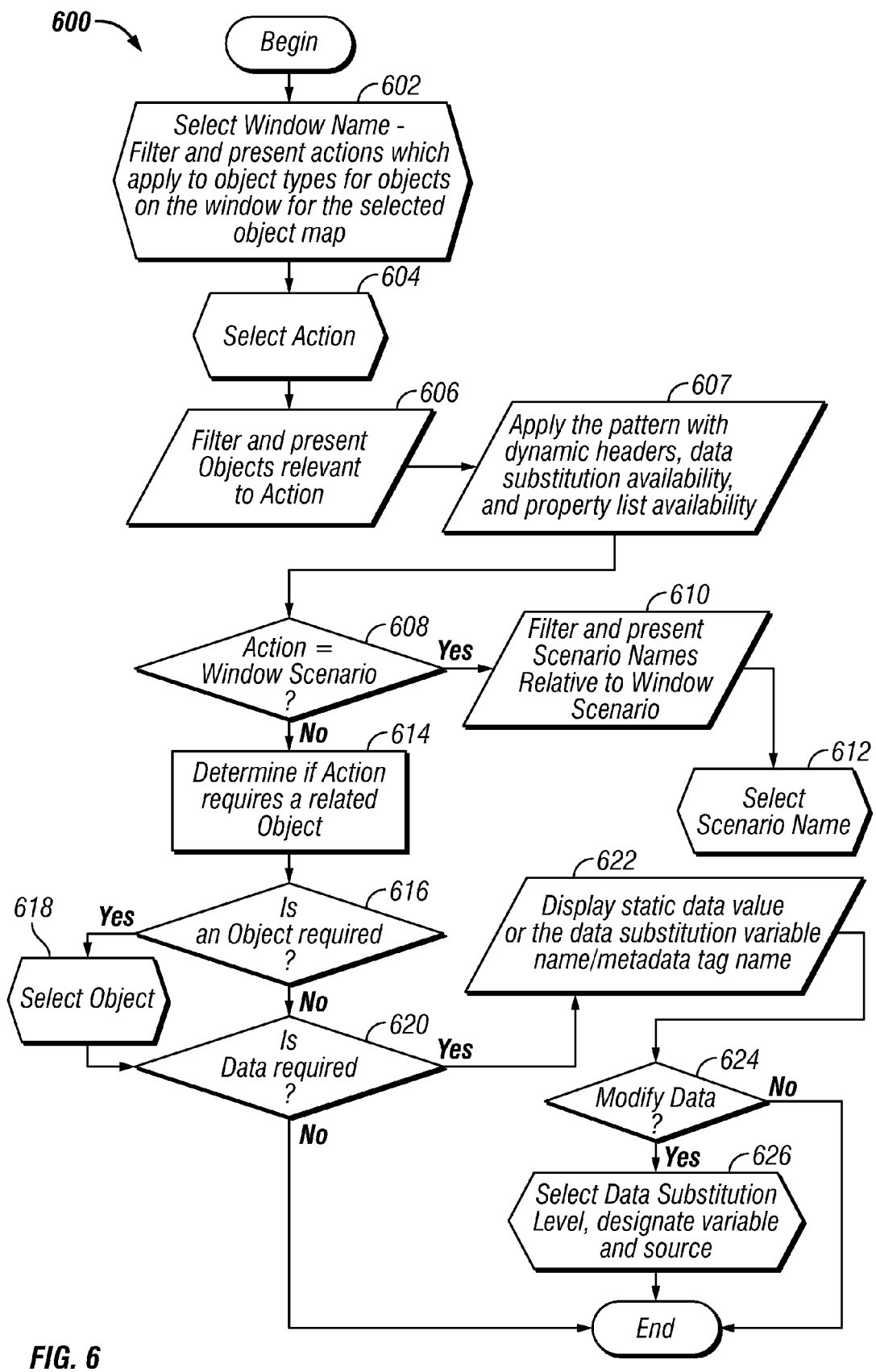
FIG. 6 is a flow diagram representing the steps necessary to establish a Test Case by defining Tasks.

FIG. 6 provides a flow diagram of the steps necessary for creation of a task 512. Task creation in the present embodiment follows the unique "window/action/object" convention. First, a window is selected 602, followed by an action 604 and then an object 618. This procedure allows for a substantial reduction in the amount of time and effort required to establish a test case because it focuses the BU's efforts on only those objects that are relevant to the particular test case (through the use of dynamic headers). In addition, a BU is more focused on the action of a given step in the testing process rather than on the object itself since the action is considered higher in priority.

The first step in establishing a task 600 is to select a window 602. Once a window is selected 602, the system filters the available actions based on the selected window 602 as determined by the actions available to the object types of all objects assigned to the window within the assigned object map 414. Next, an action is selected 604 from those actions that were filtered. The selection of an action 604 then causes the system to filter the available objects based upon the selected action and of which objects of an object type that the action can interact within the assigned object map 606.

If the selected action 604 happens to be a window scenario, a scenario name is then chosen instead of an object. A window scenario represents a collection of tasks 512 that are found on the same window and ordered into a business flow. For example, a common window scenario is one for launching a browser. Because this task is common and highly reusable, the tasks 512 used to perform this are organized into a window scenario for reuse by any navigation that has access to the object map containing it. To improve test execution fault tolerance, each window scenario features a dedicated, associated dataset. Thus, failure of a dataset during test execution is easily traceable. This also precludes the need for error handling "if-then" logic steps.

If the selected action 604 is not a window scenario, it may need an object 614. However, not all actions require an object 616. If an object is required, then the user selects one 618. If no object is required, then a determination is made by the system as to whether data is associated with the action 620. If data is associated with the task, either the data or a symbolic parameter is then statically displayed 622 and the BU is given the option of modifying the data 624. This is known as data substitution. If no data substitution is necessary, the task creation is complete. These task creation steps 600 can be repeated as necessary to populate a given test case.

FIG. 8B shows a screenshot of the task manager GUI 808 as it is used to populate a navigation 510 with necessary tasks 512. Each task 512 is represented as a row, with a specified window 810, action 812, and object or scenario name 814. If additional variables are associated with a given action/object combination, these are provided in the remaining columns 816 and 818. Once the user has selected a window from the Window dropdown 810, the system filters the actions that are available in the Action dropdown 812 with respect to the object types of objects contained within the selected window with the associated object map. Next, an action is selected. Once the action is selected the choices for column 814 are filtered. As previously mentioned, if the action was a window scenario 820, no object is available. Thus, column 814 represents the scenario name instead of an object name 820. If the action 812 corresponds to a particular object type, column 814 presents the filtered object names for selection. If a given task 814 requires additional data, any data is displayed in the remaining columns 816 and 818. If it is possible to perform data substitution on a given object's data, a small box appears to the upper right corner of the data field in columns 816 and/or 818.

Data substitution provides ability for test cases to adapt to changing business data and expected results. There are five levels of data substitution, each level having differing effects on test execution. These levels are "constant," "defined," "persistent," "prefetch," and "runtime."

"Constant" data substitution allows data to be updated in one place, and every test case that uses it will utilize the updated value. This represents static data that remains constant throughout execution. For example, the name of a particular business could be stored in a variable that would remain constant throughout execution.

"Defined" data substitution represents a sequential set of values that are iterated through during a test execution cycle. This data is imported and stored in the portal database 104 for reuse. This data is not tied to the other data used in a test case and is therefore useable over multiple test cases. For example, defined data is helpful when you wish to iterate through a list of names. A list of names can be associated with a defined variable and the list can be imported into the portal database 104. The object variable that needs to access this can be associated with the defined variable and then the test can access the list of names as necessary.

"Prefetch" data substitution allows the test system 100 to make a call to the user application's database or a test data database prior to test execution. All data needed for the test is obtained prior to the execution steps where prefetch data is used. When the test is executed, it accesses this "snapshot" of the data. This produces more consistent and predictable test results because it precludes any problems due to changes to the dataset during test execution. In addition, hits on the application database during execution are minimized which reduces any performance delays that may be encountered due to access time.

FIG. 8G illustrates a task 884 as it is configured to accept prefetch data. There is no object specified because the data is coming from the application database. The task 884 shows the record to be read as "MC1CHB05" (the Type of Prefetch Record—818) and the metadata name in which it is to be stored as "Firstchargeback" (the variable name—816).

"Runtime" data substitution allows data to be collected at runtime. This allows for a test to capture or generate dynamic data during execution that can be used during test execution. For example, a registration screen for a website under test may generate a unique customer number upon registration. Runtime data substitution will allow this unique customer number to be accessed during the remainder of test execution (within the same test execution run).

"Persistent" data substitution is unique in that it allows a test to capture, store, or generate dynamic runtime data during execution, using a metadata or variable name, as a single entry or within context of an entire record in the script server database 108 for later reuse. This makes the data persistent not only for the current test, but for future tests as well. For example, a test could be executed that would generate dynamic runtime data in response to the manual input of data. This data (dynamic or transactional) could then be saved as persistent data. Once saved, future automated test cycles could access the stored data values automatically.

In one embodiment, the persistent data feature allows the system to visit the system under test's application database to obtain test case data prior to running the test case. The system reads this data record or single data element into memory for use during the test run. When the test is executed and runtime data is generated, an option is provided to save the prefetch data and its corresponding dynamically generated runtime data as persistent data that resides in the scripting server database. This allows subsequent test case runs to access the same persistent data (both prefetch and corresponding runtime portion) to duplicate the previous run exactly. In doing so, the subsequently generated runtime data can be validated against the previously generated runtime data (now saved as persistent data).

In another embodiment, the persistent data feature allows the system under test to obtain dynamic runtime data directly from a window control object, such as a text label. For example, as shown in FIG. 8G, the task manager can be used to accomplish this by selecting a window 810 with a text label and specifying "save" as the action 812. Next, the object 814 chosen to save from would be the label whose text you wish to obtain. Finally, the object property can be selected (816) and a metadata variable such as "LabelText" can be specified (818) in which to save the label text. When the test case is executed and the label text is generated dynamically, this text is then saved as persistent data under the variable name "LabelText" and can be retrieved in subsequent test runs for validation purposes.

Once the test case hierarchy 400 is complete, the object map must be completed prior to test execution. Any object map entries with "generic" physical name entries must be changed to the actual physical name. Because this step may require more technical knowledge, it may require the assistance of a TE.

Figure 9:
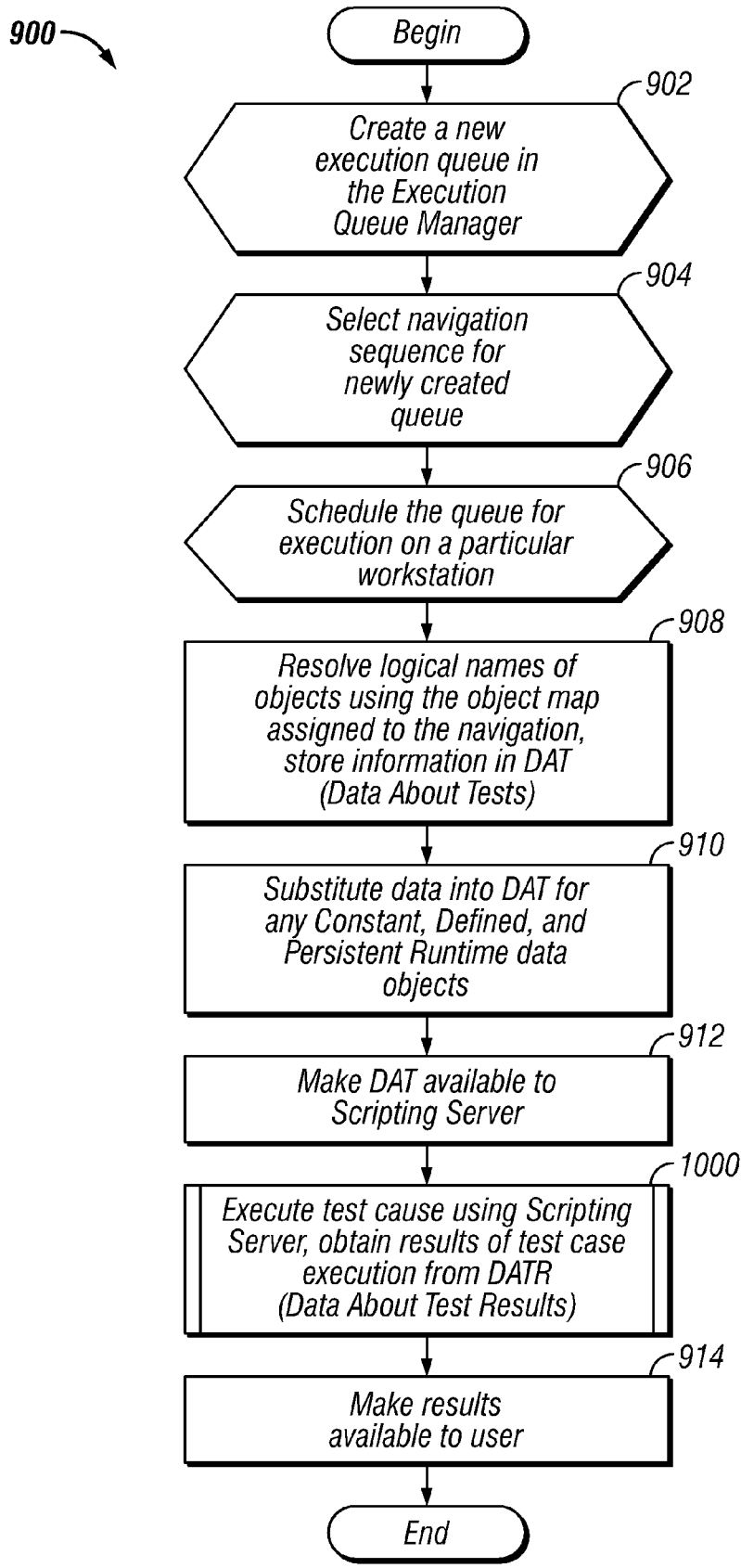
FIG. 9 is a flow diagram representing the steps taken by an embodiment of the present invention during the test execution phase of operation.

As shown in the flow diagram of FIG. 3, testing is initiated 900 by the execution queue manager (FIG. 2A, 208). This is a dedicated process that controls the running of the test cases, executing the tasks in a sequential fashion. FIG. 9 presents a flow diagram of the test execution phase.

In the test execution phase, a new execution queue 902 is created and a navigation sequence selected for the newly created queue 904. The user then identifies the workstation upon which the test is to be executed and the queue is scheduled for execution 906. Next, the queue execution information is stored in a file called the "Data About Tests" ("DAT") 908. The DAT contains, among others, resolved logical names of objects found in the object maps assigned to the various navigations 908. If the DAT contains any constant, defined, and/or persistent runtime data objects, data is substituted as necessary 910. The system next makes the DAT available to the Scripting Server for actual task execution 912. The Scripting Server then takes the DAT, executes the test, and returns the results of the test in a file known as the "Data About Tests Results" ("DATR") 1000. Finally, this DATR is made available to the user for test execution review 914. The Reports and Logging section 210 of the Portal 102 (as shown in FIG. 2A) handles the display of the results.

Figure 10:
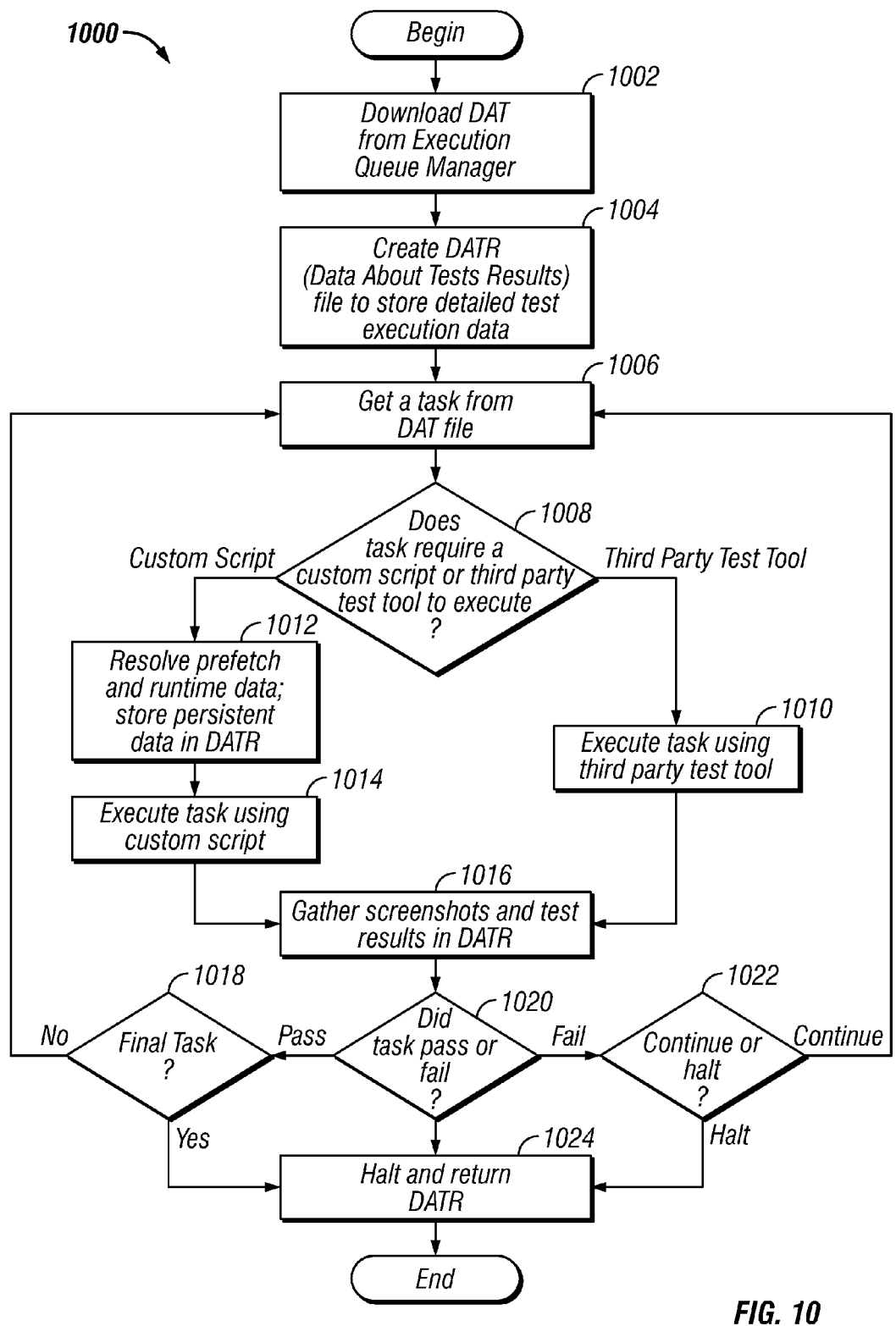
FIG. 10 is a flow diagram representing the steps performed by an embodiment of the Scripting Server during task execution of the test execution phase of operation.

FIG. 10 provides a flow diagram of the operation of the Scripting Server 1000 during the test execution phase 900 of FIG. 9. Initially, the Scripting Server is running on the test system, waiting for a DAT execution request from the Execution Queue Manager. The DAT file is first downloaded from the Execution Queue Manager 1002. Next, the Scripting Server creates the DATR file to store detailed test execution screenshots and other system results data 1004.

The Scripting Server parses the DAT file line by line, with each line representing a task that must be run 1006. Once it has a task, a determination is made as to whether the task requires a custom script or a third party test tool in order to execute 1006. If a custom script is required, the Scripting Server resolves any prefetch and runtime data and stores any persistent data in the DATR 1012. Finally, the task is executed 1014. If a third party test tool is required instead, the appropriate calls are made to the appropriate third party test tool 1010.

As the task executes, screenshots and other detailed test execution data are gathered and saved in the DATR for later access 1016. When the task completes, the Scripting Server determines if it passed or failed 1020. If it failed, a determination is then made as to whether the failure was serious enough to warrant halting the system completely and placing it into a baseline condition 1022. If the system halts, the DATR is returned to the Portal for review 1024. If it is not a serious failure, the next task is obtained from the DAT file and another portion of the test executes 1008. Likewise, if the task passed the next task is obtained from the DAT file and the sequence repeats 1018. If this was the final task, the Scripting Server halts and returns the DATR 1024 to the Portal for review.

Test execution results in the DATR are processed by the report generator 210 and stored in the portal database 104. Results from tests run on multiple systems can be verified 312 by reviewing the stored test result data through a single interface. The types of data captured during test execution include screen captures of the application under test as well as environmental and machine variables.

Referring back to FIG. 3, once the test has been executed and results obtained, results are reviewed and errors are detected 314. Once errors have been uncovered, they can be corrected 316. To verify that the errors have been truly corrected, the test execution phase can be performed again. Before this happens, a BU will once again assess whether any modifications need to be made to the test 320. Part of the test results that are provided by the report generator 210 include test coverage. An actual test report showing coverage is depicted in FIG. 8H. In this figure, the report GUI 892 features an object coverage report that shows that object "Update" was not covered 896. With this knowledge, the test can be modified 318 to include this object and the test rerun 310.

If an application under test requires manual interaction during a test cycle, a manual action keyword is provided. During test case execution when this manual action keyword is encountered test execution is halted until the manual action is completed. Once complete, automated testing resumes. To incorporate this manual action using the task manager GUI 808, the action 812 chosen is "manual action." For example, in a situation in which the test execution must be monitored by a person, "manual action" could be incorporated to verify checkpoints occurring during test execution. When a checkpoint is reached, the person monitoring the test must verify the information and then select "Yes" or "No" indicating whether the manual task/verification step was completed successfully. This provides a means for auditing test execution.

It will now be evident to those skilled in the art that there has been described herein an improved automated software application testing system that provides an efficient and effective means for conducting automatic and manual testing of complex software applications.

Although the invention hereof has been described by way of a preferred embodiment, it will be evident to one skilled in the art that other adaptations and modifications can be employed without departing from the spirit and scope thereof. The terms and expressions employed herein have been used as terms of description and not of limitation. There is no intent of excluding equivalents, but on the contrary the present invention is intended to cover any and all equivalents that may be employed without departing from the spirit and scope of the invention.

I claim:

1. An improved system for testing complex software driven applications, the system comprising:
   at least one computer processing device providing a user interface device for creating and maintaining a plurality of test cases and associated test data for the application, wherein the test cases and test data are reusable, the interface allowing a user to perform the method steps comprising;
   creating an object map which represents objects of the application to be tested;
   creating a test case hierarchy, the hierarchy including at least one project data structure to establish a top-level project node, at least one phase data structure associated with a project data structure, wherein the phase data structure is a child node of the project data structure, at least one suite data structure associated with a phase data structure;
   creating a plurality of test cases with associated test data, wherein a test case includes at least one group data structure associated with a suite data structure, wherein the group data structure is a child node of the suite data structure, at least one navigation data structure associated with a group data structure, wherein the navigation data structure is a child node of the group data structure, at least one task data structure associated with a navigation data structure, wherein the task data structure is a child node of the navigation data structure;
   initiating test case execution;
   a scripting device operable on the computer processing device for abstracting the complexity associated with third-party software testing tools, wherein the scripting device translates natural language calls into software test tool specific calls for utilizing the software testing tools; and a storage device for maintaining system settings, system data, test cases, or test data.

2. The system of claim 1 wherein the interface device presents the user with a view allowing manipulation of the hierarchical structure of each test case.

3. The system of claim 1 wherein the tasks are organized into reusable groups of windows scenarios.

4. The system of claim 1 wherein the plurality of test cases can be created before the application is available to test.

5. The system of claim 1 further comprising a report generating device, wherein the report generating device captures screenshots from the application while a test case is running and stores them in the storage device, and, wherein the user interface device can display the screenshots.

6. The system of claim 1 further comprising a report generating device, wherein the report generating device captures test coverage data representing the extent to which each of the objects of the application have been tested and stores this data in the storage device.

7. The system of claim 1 wherein the scripting device can run on a computer different from that which the user interface device is running, and, wherein the scripting device displays the current test case status as the test case is executing.

8. The system of claim 1 further comprising a plurality of object maps for use in test case creation, wherein an object map abstracts the complex physical name of an object to be tested in the application to a logical name representing the object, and, wherein the logical name may either be terse or natural language.

9. The system of claim 1 further comprising a plurality of object maps for use in test case creation, wherein an object map abstracts the complex physical name of an object to be tested in the application to a logical name representing the object, and, wherein the logical name may either be terse or natural language, and, wherein the object map can be created, modified, and displayed within either the interface device or an external spreadsheet program.

10. The system of claim 1 further comprising a plurality of object maps for use in test case creation, wherein an object map abstracts the complex physical name of an object to be tested in the application to a logical name representing the object, and, wherein the logical name may either be terse or natural language, and, wherein the interface device selectively filters the object maps available for test case creation.

11. The system of claim 1 further comprising a plurality of object maps for use in test case creation, wherein an object map abstracts the complex physical name of an object to be tested in the application to a logical name representing the object, and, wherein the logical name may either be terse or natural language, and, wherein the physical name of an object can be overridden during execution of a test case using the interface device.

12. The system of claim 1 further comprising a plurality of object maps for use in test case creation, wherein an object map abstracts the complex physical name of an object to be tested in the application to a logical name representing the object, and, wherein the logical name may either be terse or natural language, and, wherein natural language keywords represent an action to be taken on an object in the object maps.

13. The system of claim 1 further comprising a plurality of object maps for use in test case creation, wherein an object map abstracts the complex physical name of an object to be tested in the application to a logical name representing the object, and, wherein the logical name may either be terse or natural language, and, wherein natural language keywords represent an action to be taken on an object in the object maps, and, wherein at least one keyword allows for manual action to be taken during execution of a test case.

14. The system of claim 1 wherein a portion of the test data can be replaced with substitute data whose type is chosen from the group consisting of constant, defined, persistent, prefetch, and runtime.

15. The system of claim 1 wherein a portion of the test data can be substituted with persistent data, and, wherein the persistent data is dynamically generated and captured during test case execution and is stored in the storage device for later use in the same or subsequent test cases.

16. The system of claim 1 wherein a portion of the test data can be substituted with prefetch data, and, wherein the prefetch data is original application data that is obtained before test execution and subsequently retained in the storage device for later access during test case execution, and, wherein the retained prefetch data is accessed during test case execution instead of accessing the original application data.

17. An improved method for testing complex software driven applications, the method comprising the following steps:

determining the system requirements of the application;

creating an object map which represents objects of the application to be tested;

creating a test case hierarchy, the hierarchy including at least one project data structure to establish a top-level project node, at least one phase data structure associated with a project data structure, wherein the phase data structure is a child node of the project data structure, at least one suite data structure associated with a phase data structure;

creating a plurality of test cases with associated test data, wherein a test case includes at least one group data structure associated with a suite data structure, wherein the group data structure is a child node of the suite data structure, at least one navigation data structure associated with a group data structure, wherein the navigation data structure is a child node of the group data structure, at least one task data structure associated with a navigation data structure, wherein the task data structure is a child node of the navigation data structure;

initiating test case execution;

generating results based on test case execution;

verifying the results generated during test case execution;

correcting the application errors; and repeating each step as needed until there are no further errors.

18. The method of claim 17 wherein the steps for test cases creation comprise:

selecting a window in which an object resides;

selecting an action keyword representing the action to be taken in the selected window; and selecting an object that corresponds to the selected action, wherein the objects available for selection are dependent upon the action selected, and, wherein the actions available for selection are dependent upon the selected window.

19. The method of claim 17 wherein the test cases are created in natural language and are reusable for subsequent application tests.

20. The method of claim 17 wherein the object map is created and maintained using a spreadsheet program.

21. The method of claim 17 further comprising modifying the test data with substitute data whose type is chosen from the group consisting of constant, defined, persistent, prefetch, and runtime.

22. The method of claim 17 further comprising verifying manual test case steps.

23. The method of claim 17 wherein generating results comprises capturing screenshots of the application under test; and monitoring which objects are tested; and, wherein verifying the results comprises verifying that each object was thoroughly tested.

24. The method of claim 17 wherein the object map physical name can be overridden during test case execution without manually generating additional scripts, and, wherein the overridden physical name takes on the attributes of the data requested.

25. The method of claim 17 further comprising capturing test case generated data; storing the test case generated data; and wherein the test case generated data is used for subsequent test cases.

26. The method of claim 17 wherein each test case of the plurality of test cases is written in natural language.

27. The method of claim 17 wherein the test case execution includes the use of a software test-tool and, wherein each test case of the plurality of test cases is developed independently and without regard to the software test-tool.

28. A computer software program tangibly embodied in a non-transitory computer readable medium, the program including machine-readable instructions executable by a computer processor to perform a method for testing complex software driven applications, the program steps comprising:

creating an object map which represents objects of the application to be tested;

creating a test case hierarchy, the hierarchy including at least one project data structure to establish a top-level project node, at least one phase data structure associated with a project data structure, wherein the phase data structure is a child node of the project data structure, at least one suite data structure associated with a phase data structure;

creating a plurality of test cases with associated test data, wherein a test case includes at least one group data structure associated with a suite data structure, wherein the group data structure is a child node of the suite data structure, at least one navigation data structure associated with a group data structure, wherein the navigation data structure is a child node of the group data structure, at least one task data structure associated with a navigation data structure, wherein the task data structure is a child node of the navigation data structure;

initiating test case execution;

generating results based on test case execution;

verifying the results generated during test case execution;

correcting the application errors; and repeating each step as needed until there are no further errors.

* * * * *